United States Patent
Bau et al.

(10) Patent No.: US 9,122,330 B2
(45) Date of Patent: Sep. 1, 2015

(54) CONTROLLING A USER'S TACTILE PERCEPTION IN A DYNAMIC PHYSICAL ENVIRONMENT

(71) Applicant: Disney Enterprises, Inc., Burbank, CA (US)

(72) Inventors: Olivier Bau, Pittsburgh, PA (US); Ivan Poupyrev, Pittsburgh, PA (US); Mathieu LeGoc, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 326 days.

(21) Appl. No.: 13/680,770

(22) Filed: Nov. 19, 2012

(65) Prior Publication Data

US 2014/0139327 A1    May 22, 2014

(51) Int. Cl.
| | | |
|---|---|---|
| *G08B 6/00* | (2006.01) | |
| *G06F 3/041* | (2006.01) | |
| *G06F 3/01* | (2006.01) | |
| *G06F 3/0488* | (2013.01) | |
| *G06F 3/042* | (2006.01) | |

(52) U.S. Cl.
CPC ............... *G06F 3/041* (2013.01); *G06F 3/016* (2013.01); *G06F 3/0425* (2013.01); *G06F 3/0488* (2013.01)

(58) Field of Classification Search
CPC ........................................................ G06B 6/00
USPC ............ 340/407.1, 407.2, 4.12, 7.6; 715/701, 715/702; 345/174, 175, 173, 156
See application file for complete search history.

(56) References Cited

U.S. PATENT DOCUMENTS

| | | | |
|---|---|---|---|
| 5,386,219 | A | 1/1995 | Greanias et al. |
| 5,709,219 | A | 1/1998 | Chen et al. |
| 5,942,970 | A | 8/1999 | Norman |
| 6,793,619 | B1 | 9/2004 | Blumental |
| 7,755,744 | B1 | 7/2010 | Leberer |
| 7,924,144 | B2 * | 4/2011 | Makinen et al. ........... 340/407.2 |
| 8,330,590 | B2 | 12/2012 | Poupyrev et al. |
| 8,659,555 | B2 * | 2/2014 | Pihlaja .......................... 345/173 |
| 2002/0082710 | A1 | 6/2002 | Lundborg |
| 2002/0191011 | A1 | 12/2002 | Rasouli |
| 2005/0014560 | A1 | 1/2005 | Blumenthal |
| 2005/0245302 | A1 | 11/2005 | Bathiche et al. |

(Continued)

OTHER PUBLICATIONS

Campbell et ai, "What you feel must be what you see: adding tactile feedback to the trackpoint." In IFIP Interact'99, (Edinburgh, UK), IOS Press, 383-390.

(Continued)

*Primary Examiner* — Toan N Pham
(74) *Attorney, Agent, or Firm* — Patterson & Sheridan, LLP

(57) ABSTRACT

To maintain consistency in different environments with different impedances, a high voltage current driver may be used as a signal generator to output a tactile signal with a constant current. The constant current ensures that the voltage between the user's finger and the object's surface or electrode remains the same even if impedances in the electrical path change. Specifically, the current driver includes a current sensing circuit that determines the average current being generated. Using a feedback loop, the measured current is compared to a reference current to determine if the correct tactile sensation is perceived by the user. As the impedance changes, the current driver detects the resulting change in the signal's current and adjusts the voltage amplitude of the generated tactile signal in order to match the measured current to the reference current.

17 Claims, 17 Drawing Sheets

(56) References Cited

U.S. PATENT DOCUMENTS

| | | |
|---|---|---|
| 2006/0024647 A1 | 2/2006 | Chesnais et al. |
| 2006/0026536 A1 | 2/2006 | Hotelling et al. |
| 2006/0197592 A1 | 9/2006 | Chang |
| 2008/0303795 A1 | 12/2008 | Lowles et al. |
| 2009/0079550 A1 | 3/2009 | Makinen et al. |
| 2009/0109007 A1 | 4/2009 | Makinen et al. |
| 2009/0153365 A1 | 6/2009 | Salsedo et al. |
| 2009/0251421 A1 | 10/2009 | Bloebaum |
| 2010/0085169 A1 | 4/2010 | Poupyrev et al. |
| 2010/0151426 A1 | 6/2010 | Tachi et al. |
| 2010/0152794 A1 | 6/2010 | Radivojevic et al. |
| 2011/0037707 A1 | 2/2011 | Radivojevic et al. |
| 2011/0109584 A1 | 5/2011 | Linjama et al. |
| 2011/0181547 A1 | 7/2011 | Joguet et al. |
| 2011/0248962 A1 | 10/2011 | Poupyrev et al. |
| 2011/0261002 A1 | 10/2011 | Verthein |
| 2011/0276891 A1 | 11/2011 | Ecko |
| 2011/0279250 A1* | 11/2011 | Ryhanen et al. ............ 340/407.2 |
| 2011/0285666 A1 | 11/2011 | Poupyrev et al. |
| 2011/0285667 A1 | 11/2011 | Poupyrev et al. |
| 2013/0307789 A1* | 11/2013 | Karamath et al. ............ 345/173 |

OTHER PUBLICATIONS

Butler et ai, (2008). Object appreciation through haptic interaction. In Hello! Where are you in the landscape of educational technology? Proceedings ascilite Melbourne 2008 downloaded from http://www.ascilite.org.au/conferences/melbourne08/procs/butler-m.pdf, pp. 133-14.

Bau, Olivier et al., Revel: Tactile Feedback Technology for Augmented Reality, ACM Transactions on Graphics (TOG)—SIGGRAPH 2012 Conference Proceedings, Jul. 2012, vol. 31, Issue 4, ACM, New York, United States.

U.S. Appl. No. 13/603,833, entitled Using Tactile Feedback to Provide Spatial Awareness, filed Sep. 5, 2012.

* cited by examiner

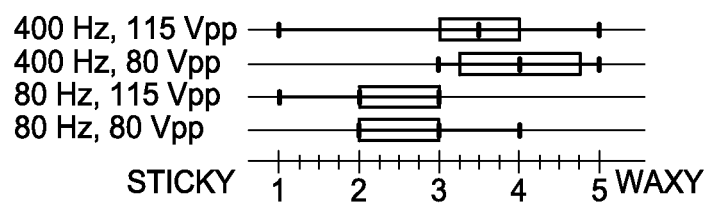
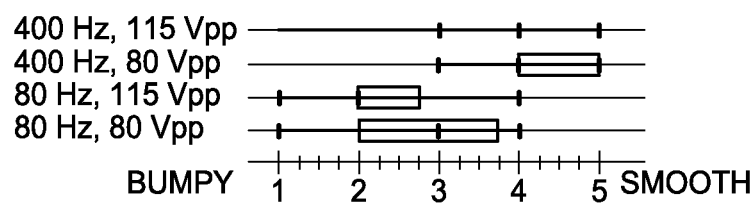
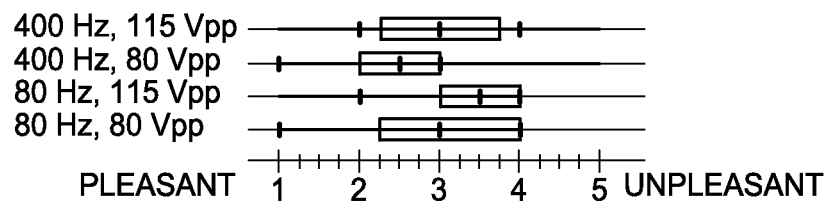
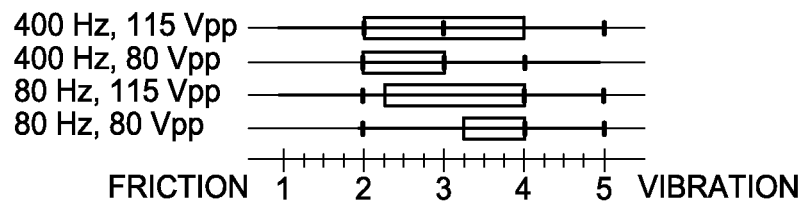
FIG. 8

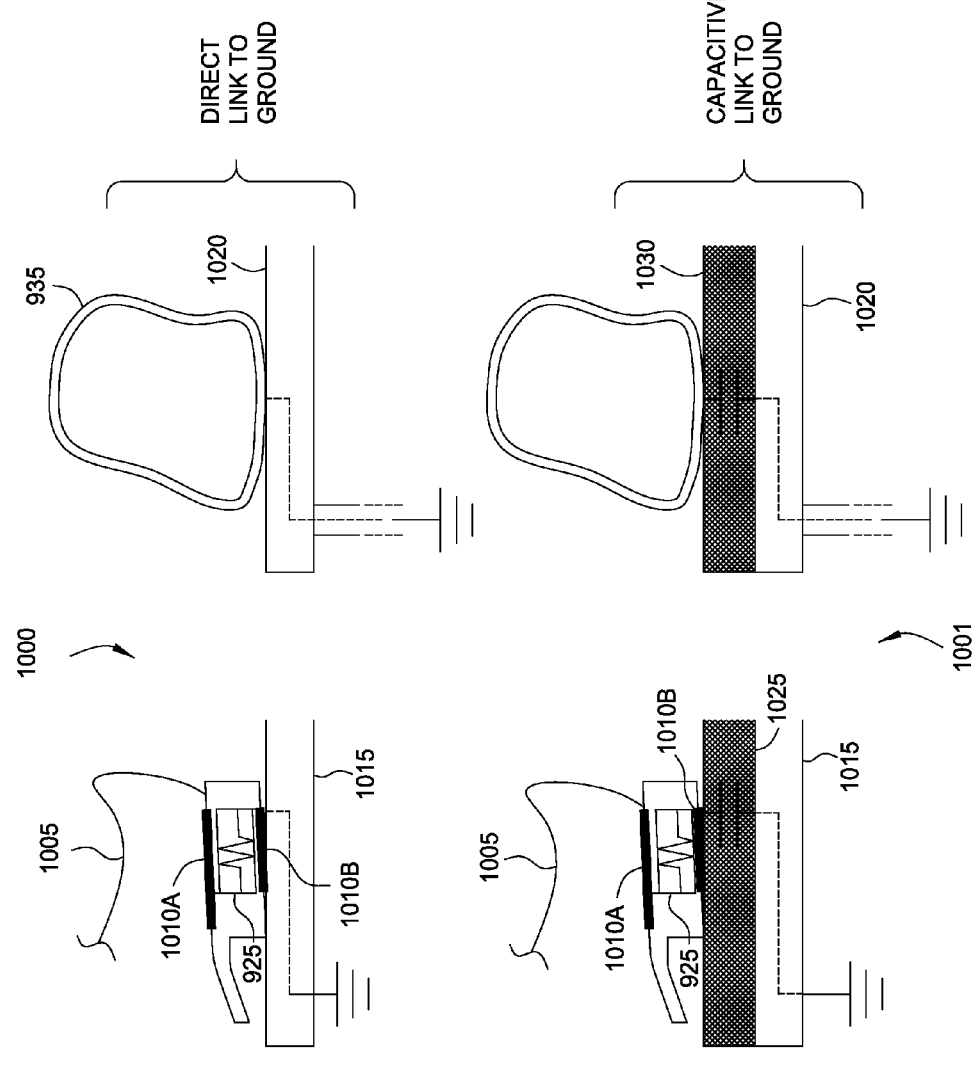

CONTROLLING A USER'S TACTILE PERCEPTION IN A DYNAMIC PHYSICAL ENVIRONMENT

BACKGROUND

1. Field of the Invention

Embodiments of the invention relate to tactile feedback, and in particular, to producing electrovibration using a current driver.

2. Description of the Related Art

Touch provides humans with a wide variety of sensations that allow us to feel the world. We can enjoy the feeling of textures, as well as objects and materials. Beyond experience, tactile sensations also guide us with everyday tasks and help us to explore object properties that we normally are not able to see.

Interest in designing and investigating haptic interfaces for touch-based interactive systems has been rapidly growing in recent years. Haptics refers to the sense of touch. This interest in haptic interfaces is fueled by the popularity of touch-based interfaces, both in research and end-user communities. However, one major problem with touch interfaces is the lack of dynamic tactile feedback. A lack of haptic feedback decreases the realism of visual environments, breaks the metaphor of direct interaction, and reduces interface efficiency because the user cannot rely on familiar haptic cues for accomplishing even the most basic interaction tasks.

In general, adding tactile feedback to different object using the same tactile feedback generator has been challenging. In one conventional approach, the touched surface itself can be actuated with various electromechanical actuators, such as piezoelectric bending motors, voice coils, and solenoids. The actuation can be designed to create surface motion either in the normal or lateral directions. Such an approach has been used in the design of tactile feedback for touch surfaces on small handheld devices by mechanically vibrating the entire touch surface. With low frequency vibrations, a simple "click" sensation can be simulated. A major challenge in using mechanical actuation with mobile touch surfaces is the difficulty of creating actuators that fit into mobile devices and produce sufficient force to displace the touch surface. Creating tactile interfaces for large touch screens, such as interactive kiosks and desktop computers, allows for larger actuators. Larger actuated surfaces, however, begin to behave as a flexible membrane instead of a rigid plate. Complex mechanical deformations occur when larger plates are actuated, making it difficult to predictably control tactile sensation or even provide enough power for actuation.

An alternative approach to actuation of the touch surface is to decouple the tactile and visual displays. In the case of mobile devices, tactile feedback can be provided by vibrating the backside of the device, stimulating the holding hand. Alternatively, it is possible to embed localized tactile actuators into the body of a mobile device or into tools used in conjunction with touch interfaces. This approach, however, breaks the metaphor of direct interaction, requires external devices, and still does not solve the problem of developing tactile feedback for large surfaces.

SUMMARY

One embodiment presented in this disclosure includes a method for providing tactile feedback to a user. The method includes generating an electrical signal in a first electrical path including an appendage of a user where the electrical signal causes the user to perceive a tactile sensation as the appendage or a conductive element held by the user moves along a surface of the object. The method also includes measuring an average current of the electrical signal and adjusting at least one characteristic of the electrical signal based on the measured current to generate a predetermined tactile sensation at the appendage.

Another embodiment includes a signal generator for providing tactile feedback to a user. The signal generator including a tactile signal module configured to generate an electrical signal in an electrical path comprising an appendage of a user where the electrical signal causes the user to perceive a tactile sensation as the appendage or a conductive element held by the user moves along a surface of the object. The signal generator includes a current sensing circuit configured to measure an average current of the electrical signal and a feedback loop configured to transmit the measured current to the tactile signal module. The tactile signal module is configured to adjust at least one characteristic of the electrical signal based on the measured current to generate a predetermined tactile sensation at the appendage.

Another embodiment includes a system including a first object and a first signal generator configured to generate a first electrical signal in a first electrical path comprising an appendage of a first user where the first electrical signal causes the first user to perceive a tactile sensation as the appendage or a conductive element held by the user moves along a surface of the first object. The first signal generator is configured to measure an average current of the first electrical signal and transmit the measured current to the tactile signal module. The tactile signal module is configured to adjust at least one characteristic of the first electrical signal based on the measured current to generate a predetermined tactile sensation at the appendage.

Another embodiment is a signal generator including a tactile signal component configured to generate an electrical signal indicative of an tactile characteristic of an object where an electrical path including the tactile signal component and the object exhibits impedance variations. The signal generator also includes a compensation component configured to adjust the electrical signal to compensate for the impedance variations to produce a compensated electrical signal, where the compensated electrical signal is coupled to a user such that the compensated electrical signal causes the user to perceive a substantially consistent tactile sensation during the exhibited impedance variations.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 8 illustrates the results of a user survey of four textures produced by four frequency-amplitude combinations, according to one embodiment described herein.

FIGS. 10A-10B illustrate conceptual diagrams of grounding a signal generator and a tactile compatible object to a common electrical reference, according to embodiments described herein.

DETAILED DESCRIPTION

Figure 1:
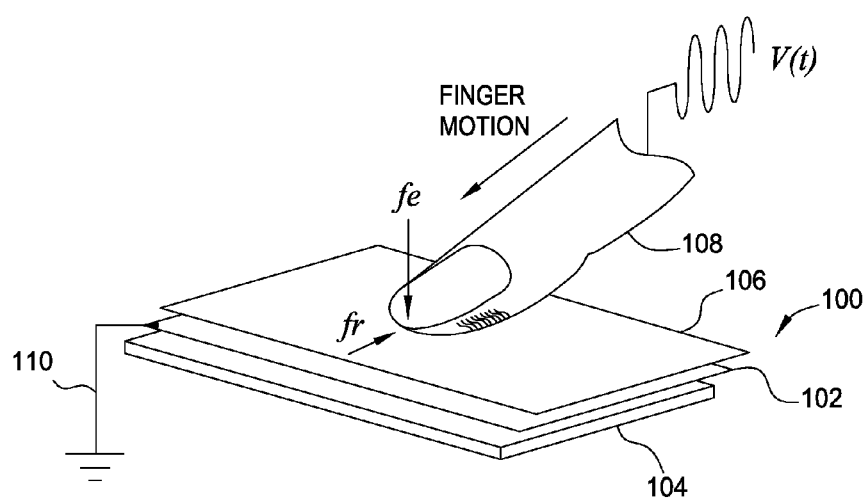
FIG. 1 is a conceptual diagram of a touch surface configured for providing electrovibration, according to one embodiment described herein.

An electrical tactile signal uses an electrical path that includes a signal generator, a user's body, and an object to generate a particular tactile sensation that is felt by the user. Specifically, the signal generator introduces the tactile signal into the user which causes an electrovibration at a point where the user contacts the object. The user perceives this electrovibration as a particular tactile sensation—e.g., waxy, smooth, rough, sticky, etc. However, the electrical path includes various impedances (e.g., the impedance between the signal generator and ground, the impedance of the user's body, or the impedance between the object and ground) which affect the amplitude of the tactile signal. If the net impedance of the electrical path changes, then the amplitude of the tactile signal, and thus, the tactile sensation also change. For example, if the user touches a different object which has a different associated impedance, even if the signal generator uses the same settings to produce the tactile signal, the signal will have a different amplitude which results in the user perceiving a different tactile sensation.

To maintain consistency in different environments with different impedances, a high voltage current driver may be used as the signal generator to maintain a tactile signal with a constant current. The constant current ensures that the voltage between the user's finger and the object's surface remains the same even if impedances in the electrical path change. Specifically, the current driver includes a current sensing circuit that determines the average current being generated. Using a feedback loop, the measured current is compared to a reference current to determine if the correct tactile sensation is perceived by the user. As the impedance changes, the current driver detects the resulting change in the signal's current and adjusts the voltage amplitude of the tactile signal in order to match the measured current to the reference current. Ensuring that the current of the tactile signal remains constant, even when the impedances of the electrical path changes, maintains the voltage between the user's finger and the object's surface resulting in the user perceiving the same tactile sensation independent of the impedances' values.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Electrovibration for Touch Surfaces

Embodiments of the invention provide mechanisms for creating tactile interfaces for touch surfaces that does not use any form of mechanical actuation. Instead, the proposed technique exploits the principle of electrovibration, which allows embodiments to create a broad range of tactile sensations by controlling electrostatic friction between an instrumented touch surface and the user's appendages (e.g., fingers, palms, hands, and the like). When combined with an input-capable interactive display, embodiments of the invention enable a wide variety of interactions augmented with tactile feedback.

FIG. 1 is a conceptual diagram of a touch surface 100 configured for providing electrovibration, according to one embodiment of the invention. Specifically, the touch surface 100 uses what may be referred to as "reverse electrovibration" where the modulating signal V(t) is introduced into the user instead of into a conductive material in the touch surface 100. The touch surface 100 includes a transparent electrode sheet 102 (i.e., a conductive material) applied onto a substrate 104 coated with an insulator layer 106. A controller causes the user finger 108 to be excited with the periodic electrical signal V(t). When an input signal of sufficient amplitude is provided, an electrically induced attractive force $f_e$ develops between a sliding finger 108 and the underlying electrode 102, increasing the dynamic friction $f_r$ between the finger 108 and the touch surface 100. Because the amplitude of $f_e$ varies with the signal amplitude, changes in friction $f_r$ are also periodic, resulting in periodic skin deformations as the finger 108 slides on the touch surface 100. These deformations are perceived as vibration or friction and can be controlled by modulating the amplitude and frequency of the applied signal. In one embodiment, the signal may provided to the electrode 102 instead of the finger 108. In this case, the input signal V(t) is uniformly propagated across the electrode 102; therefore, the resulting tactile sensation is spatially uniform. In other embodiments, V(t) may not be periodic but may be a predefined waveform (e.g., an arbitrary waveform) to generate a tactile sensation corresponding to a particular physical sensation.

In one embodiment, the insulator layer 106 may be omitted. Instead, the system may rely on the insulator properties of a user's finger or other appendage to form the capacitive arrangement shown in FIG. 1. For example, human fingers typically have a thin layer of dry or dead skin cells which may form an insulator layer between the electrode 102 and a conductive portion of the finger 108. However, sweat or other conductive moisture on the outside of this naturally occurring insulator layer of skin cells may short the capacitive effects and frustrate the user's ability to perceive the tactile sensation when sliding the finger across the touch surface 100.

In one embodiment, the electrical signal V(t) comprises a sinusoidal waveform. In other embodiments, the electrical signal V(t) comprises other waveforms, including square or triangular waveforms. In some embodiments, the signal can be mono-phasic or bi-phasic. In some embodiments, the signal is rectified. In some embodiments, the signal includes a DC (direct current) offset. In some embodiments, coupling the electrical signal V(t) to the finger 108 comprises providing the signal directly to the finger 108. In other embodiment, coupling the electrical signal V(t) to the finger 108 comprises inductively coupling the electrical signal V(t) to the finger 108 via capacitive, resistive, and/or inductive elements.

As shown, the electrode 102 can be connected to a reference point—e.g., ground 110. In one embodiment, the user can be placed at a potential difference from the electrode. Although our bodies provide a natural link to the ground, creating a direct ground connection can increase the intensity of the tactile sensation. Without such grounding, the voltage could be increased to provide the same intensity of sensation. Grounding can be achieved by directly or indirectly connecting the electrode 102 to ground 110. For example, the electrode 102 may be ground indirectly (e.g., capacitively) if the electrode 102 is separated from ground 110 by an insulative material (e.g., insulative flooring).

According to various embodiments, the insulator layer 106 can be made of different materials and can have different textures, i.e., a different finish. The electrode 102 can also be made of different materials, including ITO (Indium tin oxide), silver, conductive rubber, copper, aluminum, conductive ink, conductive glue, conductive paint or any other conductive material. The substrate 104 is not limited to any particular object with any type of surface or shape. For example, the substrate 104 may be a typical object that is modified to include the electrode 102 and insulator layer 106. Moreover, the substrate 104 may be a conductive material that was subject to an anodization process (or the like) to form the insulator layer 106 on the outside surface. Thus, the substrate 104 may serve as the electrode. Alternatively, the substrate 104 may have the electrode 102 and insulator 106 layers deposited on the substrate's outer layer to create the touch surface 100. For example, the substrate 104 may be an ordinary object (e.g., a flat surface such as a wall or a multi-dimensional object such as a coffee mug) that is coated with a conductive material (e.g., a conductive paint) and an insulator layer. The object may then be place such that it is directly or indirectly connected to ground 110.

In some cases, the critical factor for safe operation of electrical devices is current, rather than voltage. According to embodiments of the invention, induced charge in the finger causes a force on the finger, and the amount of induced current flowing through the user's hand is negligible. For example, the current supplied to the finger 108 can be limited to 0.5 mA, which is typically considered safe for humans. In some embodiment, current limitation is defined by the power rating of an operational amplifier used in the driving circuit. In fact, users experience the same amount of current while using conventional capacitive touch panels. To further protect the user, some embodiments can implement a current limiting circuit.

"Electrovibration" tactile actuation differs from "electrocutaneous" and "electrostatic" tactile actuation. Electrocutaneous displays stimulate tactile receptors in human fingers with electric charge passing through the skin. In contrast, there is no passing charge in electrovibration: the charge in the finger is induced by a charge moving on a conductive surface. Furthermore, unlike electrocutaneous tactile feedback, where current is directly stimulating the nerve endings, stimulation with electrovibration is mechanical, created by a periodic electrostatic force deforming the skin of the sliding finger.

In the electrostatic approach, a user is manipulating an intermediate object, such as a piece of aluminum foil, over an electrode pattern. A periodic signal applied to this pattern creates weak electrostatic attraction between an object and an electrode, which is perceived as vibration when the object is moved by the user's finger. The tactile sensation, therefore, is created indirectly: the vibration induced by electrostatic force on an object is transferred to the touching human finger. In case of electrovibration, no intermediate elements are required; the tactile sensation is created by directly actuating the fingers.

Tactile feedback based on electrovibration has several compelling advantages. Embodiments of the invention provide a mechanism that is fast, low-powered, dynamic, and can be used in a wide range of interaction scenarios and applications, including multi-touch interfaces. Embodiments of the invention demonstrate a broad bandwidth and uniformity of response across a wide range of frequencies and amplitudes. Furthermore, the technology is highly scalable and can be used efficiently on substrates 104 of any size, shape, and/or configuration, including large interactive objects, hand-held mobile devices, as well as curved, flexible, and/or irregular surfaces. Lastly, because embodiments of the invention do not have any moving parts, they can be easily implemented in existing devices with minimal physical modification to the devices.

In one embodiment, the touch surface 100 may have a special function such as a multi-touch interactive tabletop, a wall mounted surface, or any other technically feasible configuration. A touch surface 100 that is a touch panel can be used as a projection and input surface. An additional diffuser plane can be installed behind the panel. A projector can be used to render graphical content. To capture the user input, the panel can be illuminated from behind with infrared illuminators. An infrared camera captures reflections of user fingers touching the surface. For example, the multi-touch tracking can be performed at 60 frames per second. Finger positions are transmitted to a hardware mechanism and/or software application responsible for controlling interactive features, visual display, and tactile output. This implementation is scalable and can be adapted to other input techniques, including frustrated internal reflection and surface acoustic tracking, among others. It can be easily extended, modified and applied to any surface or device. Indeed, since there is no mechanical motion, almost any object (i.e., substrate 104) can be instrumented with electrovibration-based tactile feedback. The electrodes can be transparent or opaque, be painted on curved and irregular surfaces, and added to any display, hand tool, or appliance. In other embodiments, other sensing technologies can be used in combination with the electrovibration techniques described herein, such as distance tracking, pressure input, contact area tracking, among others.

Figure 2A:
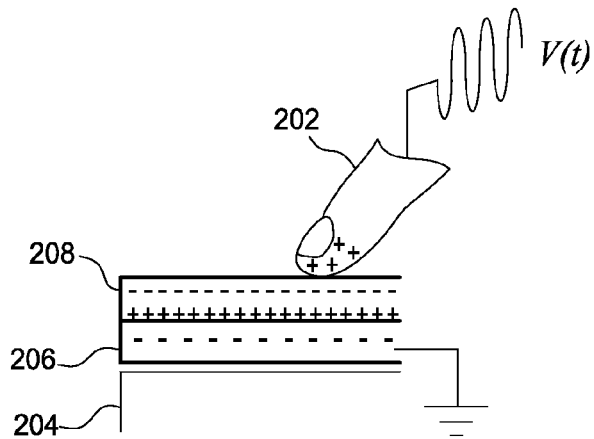
FIGS. 2A-2C illustrate electrical charges corresponding to electrovibration actuation, according to embodiments described herein.
Figure 2B:
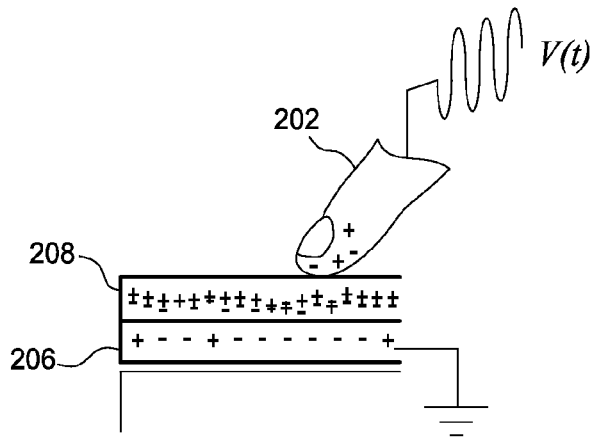
Figure 2C:
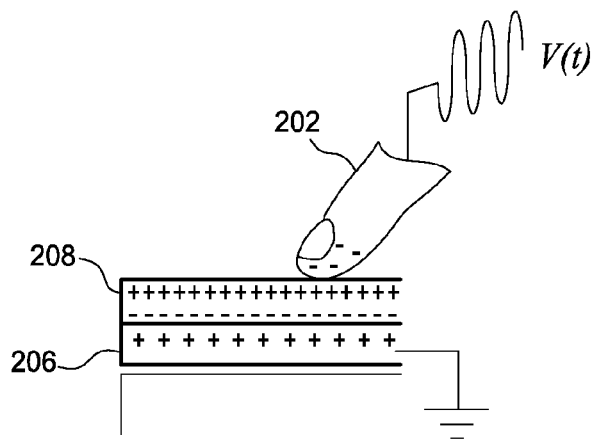

FIGS. 2A-2C illustrate electrical charges corresponding to electrovibration actuation, according to embodiments of the invention. As shown in FIG. 2A, a touch surface comprises a substrate 204, an electrode 206, and an insulation layer 208. An input signal V(t) is applied to the finger 202. The input signal V(t) can oscillate and cause positive and negative charges to alternate within the finger 202. At the time shown in FIG. 2A, the charges in the finger 202 are positive. When the user's finger 202 is placed in contact with the insulation layer 208, positive charges in the finger 202 cause negative charges to accumulate along the top portion of the insulation layer 208 and positive charges to accumulate along the bottom portion of the insulation layer 208. This causes negative charges to be induced in the electrode 206.

As described, as the input signal V(t) oscillates, so do the charges in the finger 202. This causes the charges in the insulation layer 208 to "flip-flop" within the insulation layer 208. As shown in FIG. 2B, the positive charges within the insulation layer 208 are moving upwards (i.e., towards the user's finger 202), and the negative charges within the insulation layer 208 are moving downwards (i.e., towards the electrode 206). FIG. 2B also illustrates that some of the charges in the finger 202 are now negative. The positive charges within the insulation layer 208 begin moving upwards, and the negative charges within the insulation layer 208 start to move downwards. Positive charges have also started to accumulate within the electrode 206.

FIG. 2C illustrates the changes within the touch surface at yet another point in time. As shown, the charges in the finger 202 are now negative. When placed in contact with the insulation layer 208, negative charges in the finger 202 cause positive charges to accumulate along the top portion of the insulation layer 208 and negative charges to accumulate along the bottom portion of the insulation layer 208. This causes positive charges to accumulate in the electrode 206.

As described, a input signal V(t) applied to the finger 202 displaces charges within the insulation layer 208, creating an oscillating electric field. When the finger 202 is placed on the surface of the touch panel, a periodic motion of electrical charges is induced in the tip of the finger 202. As described above, in other embodiments, the electrical signal V(t) can be applied to the electrode 206 and a path to ground is provided by the finger 202.

Figure 3A:
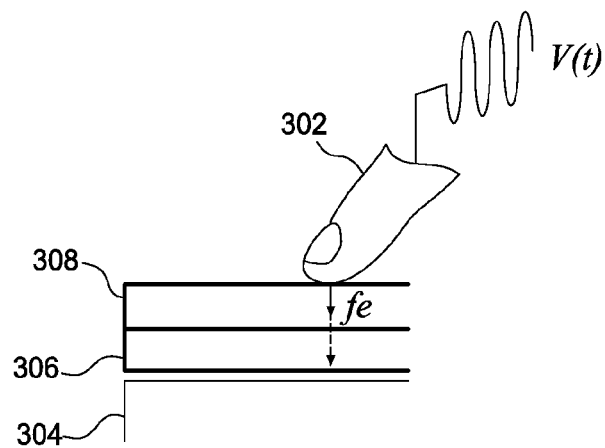
FIG. 3A illustrates an attractive force induced between a finger and a touch surface, according to one embodiment described herein.

FIG. 3A illustrates an attractive force $f_e$ induced between a finger 302 and a touch surface, according to one embodiment of the invention. The touch surface comprises a substrate 304, an electrode 306, and an insulation layer 308. An input signal V(t) is applied to the finger 302. When an input signal V(t) of sufficient amplitude is provided, the electrically induced attractive force $f_e$ develops between the finger 302 and the underlying electrode 306. The induced attractive force $f_e$ oscillates between a stronger force and a weaker force as the charges oscillate within the finger 302. The oscillation of the magnitude of the induced attractive force $f_e$ is illustrated in the FIG. 3A with the dotted arrow representing the induced attractive force $f_e$.

Figure 3B:
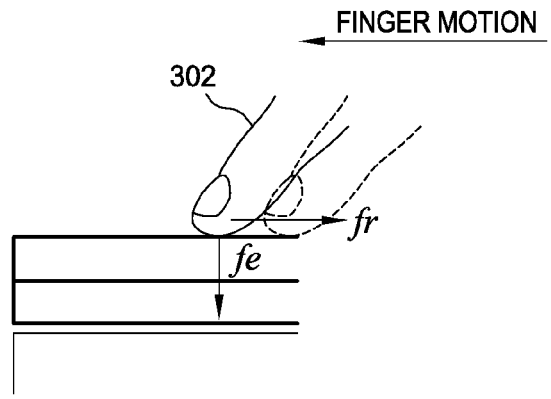
FIGS. 3B-3C illustrate an attractive force induced between a finger and a touch surface and a friction force between the sliding finger and the touch surface, according to embodiments described herein.
Figure 3C:
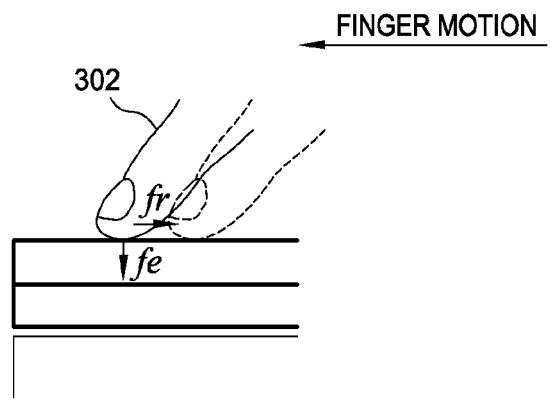

FIGS. 3B-3C illustrate an attractive force $f_e$ induced between a finger 302 and a touch surface and a friction force $f_r$ between the sliding finger 302 and the touch surface as the finger 302 slides in the direction of the finger motion, according to embodiments of the invention. Because the amplitude of $f_e$ varies with the signal amplitude, changes in friction $f_r$ are also periodic, resulting in periodic skin deformations as the finger 208 slides on the touch surface 200. These deformations are perceived as vibration or friction and can be controlled by modulating the amplitude and frequency of the applied signal.

FIGS. 3B-3C illustrate the finger 302 sliding along the touch surface. As shown, the magnitude of the attractive force $f_e$ and the friction force $f_r$ shown in FIG. 3B (i.e., at one finger position) is greater than the magnitude of the attractive force $f_e$ and the friction force $f_r$ shown in FIG. 3C (i.e., at another finger position). In some embodiments, these changes in the magnitude of the friction force $f_r$ are periodic as the user slides the finger 302 along the touch surface, resulting in periodic skin deformations that are perceived as texture.

Figure 4:
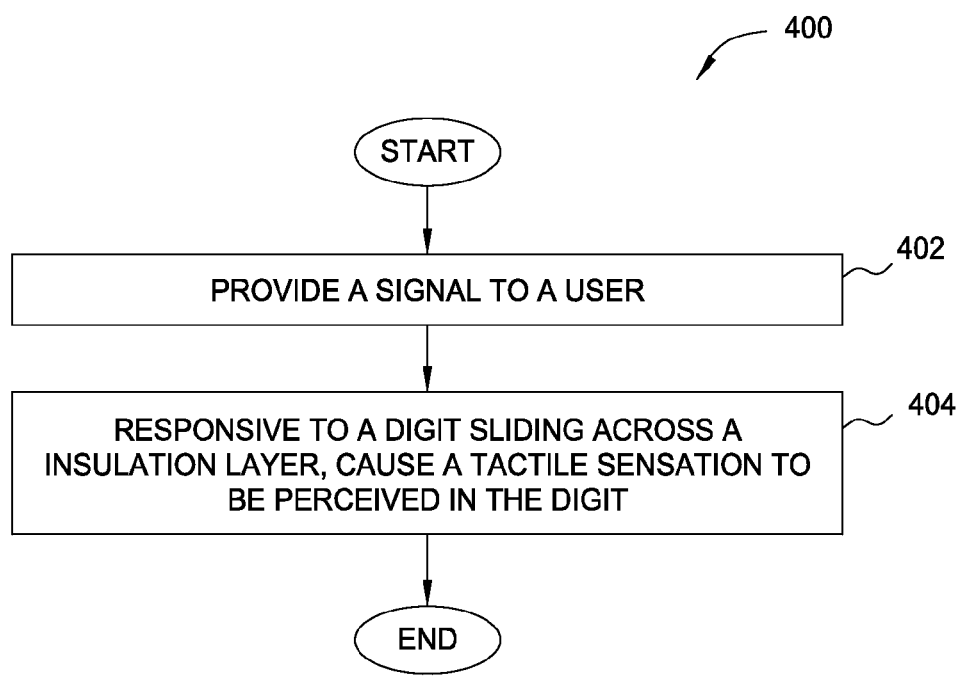
FIG. 4 is a flow diagram of method steps for providing electrovibration actuation, according to one embodiment described herein.

FIG. 4 is a flow diagram of method steps for providing reverse electrovibration actuation, according to one embodiment of the invention. Persons skilled in the art would understand that, even though the method 400 is described in conjunction with the systems of FIGS. 1-3C, any system configured to perform the method steps, in any order, is within the scope of embodiments of the invention.

As shown, the method 400 begins at step 402, where a signal is provided to a user of a device generating a modulated signal as shown in FIG. 1. The signal can be generated by a signal generator included within the device. In one example, the device includes a metal surface that electrically couples the user to the device and permits the signal to reach the user's finger in contact with the touch surface. Electrically coupling the device to the user can include providing the signal directly to the user, inductively coupling the user to the device, or any other similar technique for coupling a signal to a user.

At step 404, responsive to a user sliding an appendage along an insulation layer of a grounded touch surface, a tactile sensation is perceived by the user. As described herein, the touch surface can includes an electrode placed between a substrate and an insulation layer. In some embodiments, the appendage is a finger, multiple fingers, a palm, the hand, and the like. In other embodiments, the user may detect the electovibration by sliding an object, e.g., a stylus, along the surface of the insulation layer. That is, the tactile signal varies the frictional force between the tip of a conductive stylus and the insulation surface which is felt by the user holding the stylus.

In some embodiments, the method 400 described in FIG. 4 corresponds to the arrangement shown in FIG. 1 where the signal is applied to the user and the electrode is connected to a path to ground. As described, changes in the magnitude of a friction force $f_r$ between the digit and the insulation layer can be periodic as the user slides the digit along the touch surface, resulting in periodic skin deformations that are perceived as texture.

Perception-Based Characteristics of Electrovibration

As described above, varying the frequency, amplitude, DC offset, and/or any other properties of the input signal to a user appendage causes the user to feel different tactile feedback. The tactile feedback perceived by a particular individual may be different than the sensation perceived by another individual.

In some embodiments, there is a baseline of human sensitivity that defines an absolute detection threshold and frequency and amplitude discrimination thresholds. In the case of electrovibration, the absolute detection threshold is the minimum voltage amplitude that creates a barely detectable sensation at a specific frequency. Voltages below the detection threshold are not usable in creating haptic sensations. In some embodiments, the frequency of the input signal affects the absolute detection threshold.

Figure 5:
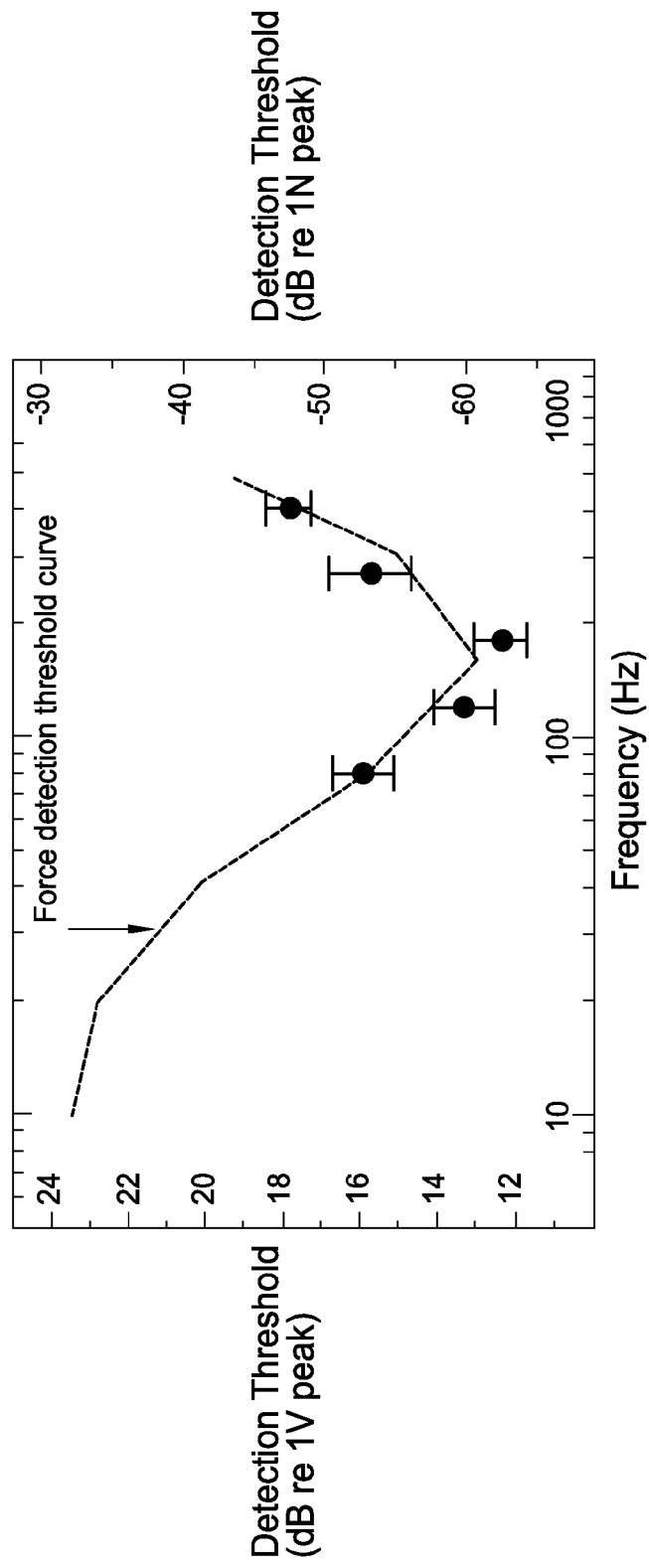
FIG. 5 is a graph of absolute detection thresholds for different frequencies of an input signal, according to one embodiment described herein.

FIG. 5 is a graph of absolute detection thresholds for different frequencies of an input signal, according to some embodiments of the invention. The data shown in FIG. 5 is based on a user survey and is not meant to be limiting. The data shown in FIG. 5 merely shows one example of absolute detection thresholds for different frequencies.

The absolute detection thresholds for five reference frequencies are shown in FIG. 5. The mean detection thresholds of electrovibrations with standard error bars are shown on the left axis and a force detection threshold curve is shown with units along the right axis. The thresholds are defined in "dB re 1 V peak" units computed as $20 \log_{10}(A)$ where A is the signal amplitude in Volts. Using this unit is a standard practice in psychophysical experiments due to linearity of human perception in logarithmic scale. For comparison, a force detection threshold curve is also plotted in FIG. 5. In this example, there was a statistically significant effect of frequency on the threshold levels ($F(4,36)=12.8$; $p<0.001$), indicating that the threshold levels depend on the stimulus frequency.

The amplitude and frequency discrimination thresholds are typically referred to as just-noticeable-differences (JNDs), which are the smallest detectable differences between two stimuli. The detection and discrimination thresholds together form a set of fundamental measures that describe the dynamic range and processing capabilities of electrovibration sensations. These measures can be used to design interfaces and applications using embodiments of the invention.

In some embodiments, the detection threshold levels for electrovibrations closely coincide with the force detection threshold levels for sinusoidal stimulus. Experiments have shown that sensations created with embodiments of the invention are closely related to perception of forces lateral to the skin. The relation between electrovibration voltages and perceived forces may not be linear.

In some embodiments, the detection threshold levels provide guidelines for designing tactile interfaces using electrovibration. For example, the detection threshold levels inform the designer that at each frequency the applied voltage must be above the corresponding detection threshold level in order to provide a tactile sensation that a user can perceive. They also allow optimizing power requirements. For example, at 400 Hz the tactile signal could create an easily discernible tactile sensation at 18 dB re 1 V level or 16 Vpp. On the other hand, at 180 Hz the voltage threshold level is half of that, requiring significantly less power (12 dB re 1 V peak or 8 Vpp). Therefore, tactile feedback can be optimized to require less power, which can be especially important for mobile devices.

The frequency and amplitude discrimination thresholds describe the resolution of human perception: they determine the granularity of tactile sensations that can be used in designing interfaces. For example, if designers want to create two distinct tactile sensations, then they would make sure that the amplitude of voltages for each sensation are at least a certain voltage different apart from one another for the user to be able to differentiate them. Similar considerations also apply for frequency of stimuli.

Figure 6:
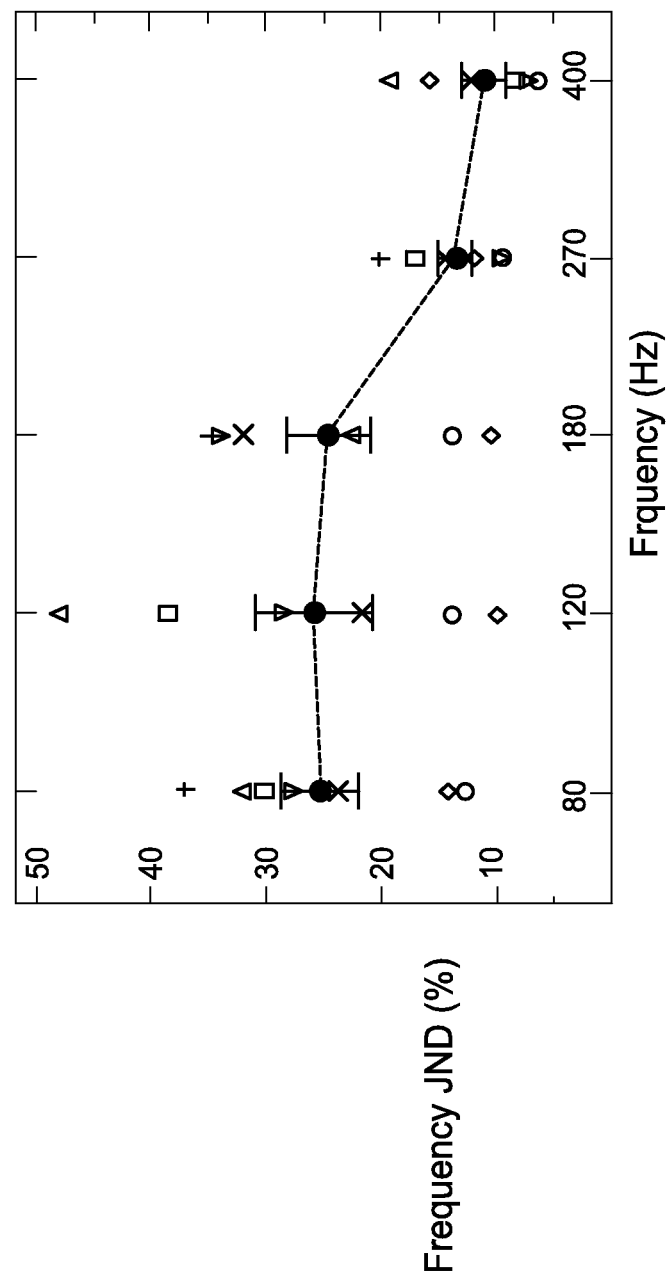
FIG. 6 illustrates frequency just-noticeable-differences (JNDs) based on a user survey, according to one embodiment described herein.

FIG. 6 illustrates frequency just-noticeable-differences (JNDs) based on a user survey, according to one embodiment of the invention. Five subjects were subjected to a test at five different frequency levels. The results for each subject are shown in FIG. 6 with a different symbol corresponding to each subject. Also shown are the average values with standard error bars. It should be understood that the results shown in FIG. 6 are not meant to be limiting, but rather show one example of frequency discrimination thresholds.

Figure 7:
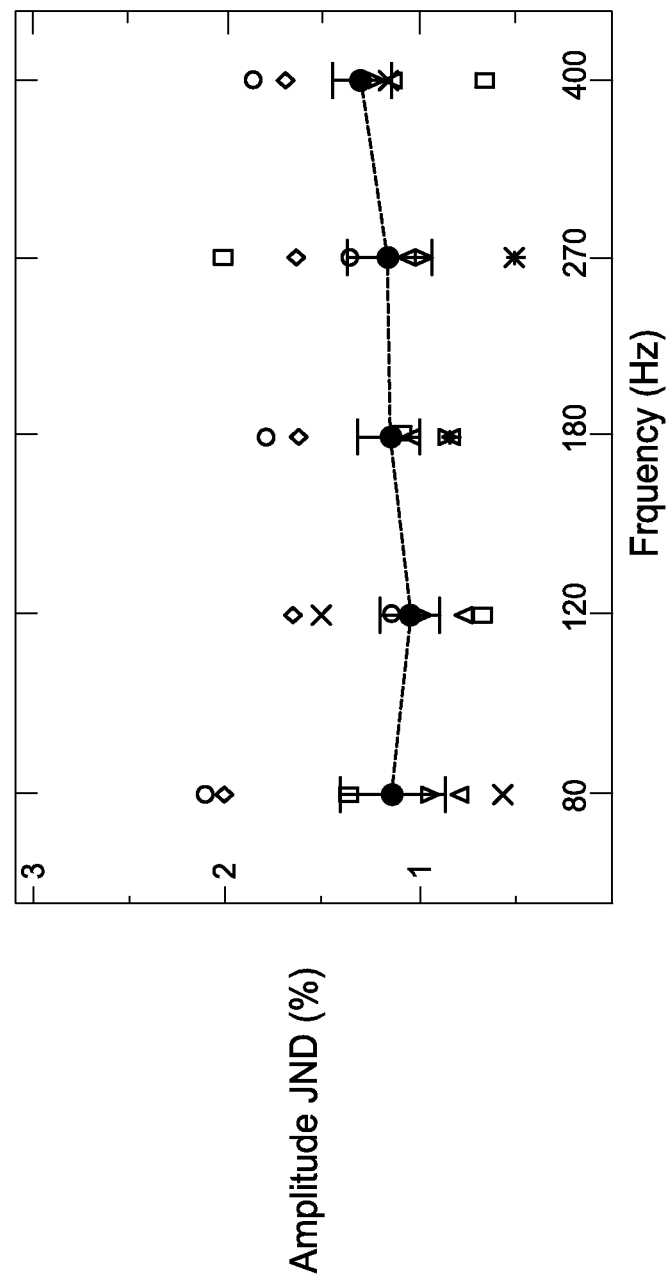
FIG. 7 illustrates amplitude JNDs based on a user survey, according to one embodiment described herein.

FIG. 7 illustrates amplitude just-noticeable-differences (JNDs) based on a user survey, according to one embodiment of the invention. Five subjects were subjected to a test at five different frequency levels. The results for each subject are shown in FIG. 7 with a different symbol corresponding to each subject. Also shown are the average values with standard error bars. It should be understood that the results shown in FIG. 7 are not meant to be limiting, but rather show one example of amplitude discrimination thresholds.

As described, the sensations felt by individual users can vary from person to person. FIG. 8 illustrates the results of a user survey of four textures produced by four frequency-amplitude combinations, according to one embodiment of the invention. As shown, users were subjected to four combinations of frequency and amplitude, including 80 Hz-80 Vpp (voltage peak-to-peak), 80 Hz-115 Vpp, 400 Hz-80 Vpp, and 400 Hz-115 Vpp.

Low frequency stimuli were perceived as rougher compared to high frequencies. They were often likened to "wood" and "bumpy leather," versus "paper" and "a painted wall" for higher frequency stimuli.

The effect of amplitude depends on stimuli frequency. For high frequency textures (e.g., 400 Hz) an increase of amplitude increased perceived smoothness of tactile sensations. Similarly, at 80 Vpp textures were mostly compared to "cement surface" and "cheap paper," and at 115 Vpp they were compared to "paper" or "a painted wall." Some participants explicitly pointed out this increase in perceived smoothness.

At low frequencies (e.g., 80 Hz), an increase in stimuli amplitude heightens the perception of stickiness. While some participants referred explicitly to a "sticky" sensation, others compared the sensation to that of touching a "motorcycle handle" or "rubber." Other participants associated viscosity with this type of texture. One participant compared his experience to "running fingers through viscous liquid."

Again, it should be understood that the results shown in FIG. 8 are not meant to be limiting, but rather show one example of amplitude discrimination thresholds.

Systems for Generating Reverse Electrovibration

Figure 9A:
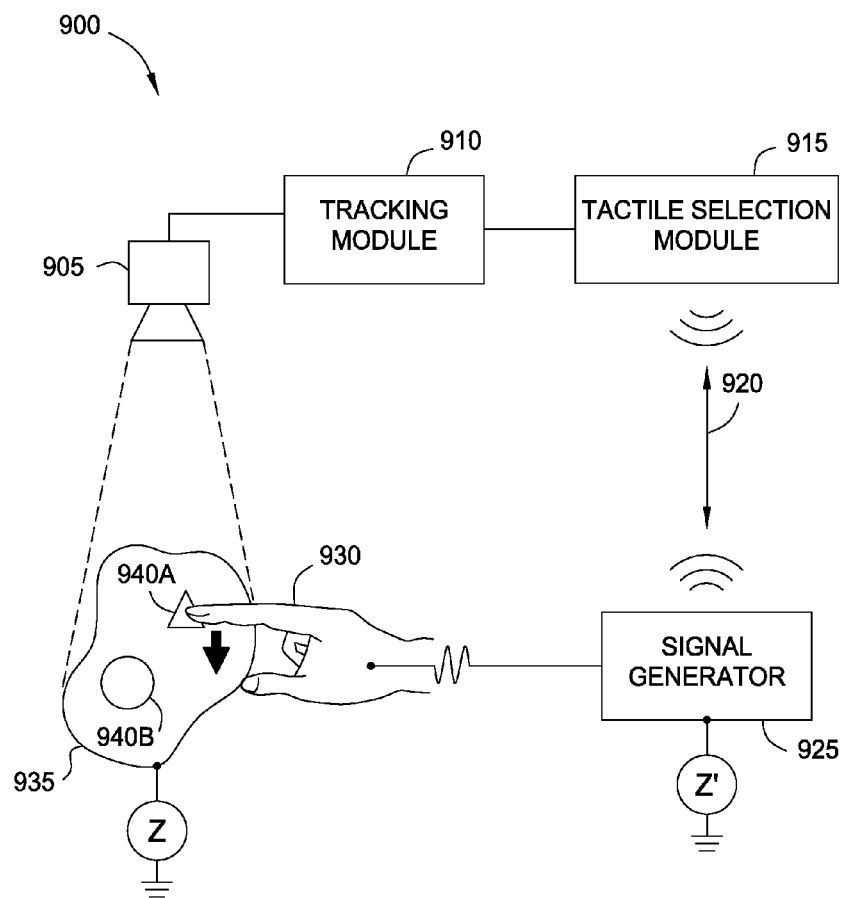
FIGS. 9A-9B illustrate systems of providing a tactile signal to a user, according to embodiments described herein.
Figure 9B:
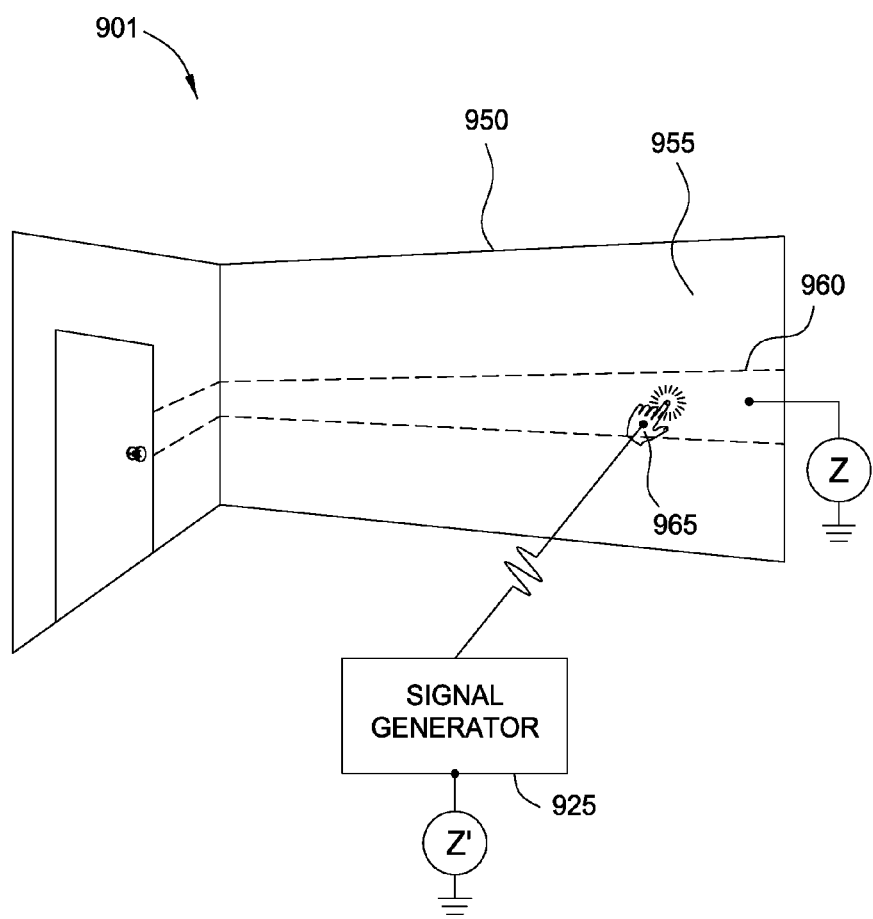

FIGS. 9A-9B illustrate systems of providing a tactile signal to a user, according to embodiments described herein. As shown in FIG. 9A, the system 900 includes a camera 905 which records images or video of a user appendage 930 interacting with an object 935. The camera 905 may be any type of device capable of capturing information that may be used to determine the location of the user's finger 930 on the object 935 such as an infrared, radar, microwave imaging, and the like. The camera 905 is communicatively coupled to a tracking module 910 which uses the information provided by the camera to determine the location of the finger 930 on the object 935. In other embodiments, the camera 905 may be replaced by different tracking devices that are able to sense the position of the user's finger on the object 935 such as capacitive sensing, Frustrated Internal Reflexion Sensing, and the like.

The tracking module 910 may include software, hardware, or a mixture of both that executes image processing algorithms for identifying the user finger 930 in an image produced by the camera 905 and determining whether the finger 930 is an area of interest 940. As shown, the object includes two areas of interests 940A and 940B. These areas 940A-B may either be displayed visually to the user or mapped in the tracking module 910 without the user having knowledge of the location of the areas of interest 940 on the surface of the object 935. The tracking module 910 determines whether the user's finger 930 is in one of the area of interests, and if so, which area.

The tactile selection module 915 receives from the tracking module 910 a signal indicating whether the finger 930 is in one of the areas of interest 940 on the object 935. If so, the tactile selection module 915 determines a tactile sensation that corresponds to the different areas. For example, area 940A may be associated with a different tactile sensation than area 940B. The camera 905 and tacking module 910 provide the tactile selection module 915 with the information needed to determine which area of interest 940 the finger 930 is contacting, and thus, identify the correct tactile sensation that should be provided to the user. In one embodiment, the tactile selection module 915 may not select a tactile sensation if the finger 930 contacts the surface of the object 935 in an area outside of the areas of interest 940. Alternatively, the tactile selection module 915 may select a default tactile sensation which changes once the finger 930 moves into an area of interest 940.

Nonetheless, the tactile sensation module 915 transmits data to the signal generator 925 which identifies a particular tactile sensation. As shown, the tactile selection module uses a wireless communication network 920—e.g., Bluetooth®, wireless LAN or WAN, and the like. In other embodiments, the tactile selection module 915 and signal generator 925 may be integrated into a single device or use wired communication network (e.g., Ethernet, RDMA, USB, InfiniBand®, and the like). The tactile sensation module 915 may transmit using the network 920 a digital code in a data packet which corresponds to a particular tactile signal (e.g., a periodic waveform).

The signal generator 925 decodes the data packet received from the tactile selection module 915 and generates an analog signal—V(t)—as shown in FIG. 1. Thus, the signal generator 925 is electrically coupled to the finger 930. However, the signal generator 925 does not need to be directly attached to the finger 930; instead, the generator 925 may be directly or indirectly coupled to any part of the user so long as there exists a conductive path from the point of coupling to the user appendage that is contacting the object 935. For example, the signal generator 925 may be worn on the user's body, held by the user, incorporated into an article of clothing worn by the user, mounted on furniture the user is interacting contacting, and the like. The generator 925 may include an electrode or conductive connector that contacts the user's body and introduces the tactile signal into the user's body to create the charge fluctuations at the finger 930 as explained in FIGS. 2A-2C. The user may, for example, hold the signal generator 925 at the electrode or wear a conductive connector such as a wrist band which connects the user to the generator 925. Moreover, the electrode or conductive connector do not need to come into direct contact with the user's body to inject the signal but may rely on indirect coupling such as capacitive or inductive coupling.

The signal generator 925 also has some impedance (Z') to ground—i.e., a electrical reference point. The impedance Z' may vary as the signal generator 925 is moved to different locations. For example, the signal generator 925 may be mounted in a cane and includes one electrode used to inject the tactile signal into the user at a portion of the cane held by the user and a second electrode at a bottom of the cane that contacts the floor. This second electrode is used to connect the signal generator 925 to ground (e.g., earth ground). However, the type of flooring separating the second electrode from earth ground partly determines the value of the impedance Z'. An insulated floor such as carpet or rubber may increase Z' while conductive flooring such as metal may lower Z'. Thus, as the user moves the signal generator (e.g., the cane) onto different floors, the value of Z' fluctuates.

Once the signal generator 925 introduces the analog tactile signal into the finger 930, the user may perceive the associated tactile sensation as she moves the finger across the surface of the object 935 (as shown by the arrow). Specifically, the fluctuating electrical charges in the finger create a varying frictional force at the surface which generates the tactile sensation. In object 935, two areas of interest 940A-B have been defined which may be assigned the same or different tactile sensations. In the embodiment shown, the entire object 935 is covered with an electrode and insulator layer combination. The electrode is then coupled to ground. Thus, both the object 935 and the signal generator 925 are coupled to the same electrical reference point. Because the tactile signal is provided to the user rather than the object 935, the object may be referred to as "passive" and does not need to communicate with any additional instrumentation to control the electrode on the object 935. Moreover, a passive object 935 enables two users that are electrically coupled to two different signal generators 925 to touch the same object 935 and perceive two different tactile sensations. Because the passive object 935 provides a common ground, one the signal generators 925 can produce the tactile signal corresponding to a waxy sensation while the other signal generator 925 generates the tactile signal corresponding to a rough sensation. For example, one user may touch the area 940A while the second user touches area 940B. The tracking finger then instructs the respective signal generators 925 coupled to the users to produce the different tactile signals which can be perceived simultaneously.

In one embodiment, instead of relying on earth ground, the respective ground connections between the signal generator 925 and the object 935 may be directly coupled. For example, the user may connect a clip and cable connected to the signal generator's ground interface to a conductive table on which the object 935 rests. This action couples the electrode of the object 935 to the ground interface of the signal generator 925, and thus, the object 935 and the generator 925 share a common electrical reference.

Regardless of the method of connecting the electrode in the object 935 and the signal generator 925 to a common ground, the object 935 also includes an impedance Z between the object 935 and ground. The impedance Z may vary depending on the different configurations used to connect the electrode in the object 935 to the shared ground. For example, the electrode may be directly connected to earth ground which would result in a lower value of Z than if the electrode was indirectly coupled to ground. Directly connecting the electrode to earth ground may include using a wire which at one end is connected to the electrode and at the other end connected to the earth ground contact in a typical wall-mounted AC power socket. The electrode may be indirectly connected to earth ground (e.g., capacitive coupled) when a thin insulator (in addition to the insulator layer on the object's surface) separates the electrode from an electrical path to earth ground.

In one embodiment, instead of covering the entire surface of the object 935 with the electrode, the object 935 may include one or more individual electrodes, with respective connections to ground, that cover only a portion of the object's surface. For example, the object 935 may be altered to include electrodes only at the areas of interest 940. To achieve this, the object 935 is fabricated to include an electrode located at each of the areas of interest 935 as well as an insulator layer covering the electrodes. In this manner, the tactile sensation is felt only at the locations of the areas of interest 940. That is, even if the signal generator 925 injects the tactile signal into the finger 930, the user would not feel the associated tactile sensation unless the finger 930 contacts the object 935 and is in close proximity to the electrodes at the areas of interest 940. This embodiment may eliminate the need to track the finger 930 since the user only perceives the tactile sensation when the finger is located within the areas of interests 940—i.e., the camera 905, tracking module 910, and tactile selection module 915 may be inactive or removed from the system 915. However, if the tracking system is removed, the signal generator may not receive the information necessary to provide different tactile signals when the user contacts the different areas of interest 940A-B.

Moreover, the different elements shown in system 900 may be integrated into one or more devices. For example, the camera 905, tracking module 910, tactile selection module 915, and signal generator 925 may be integrated into a single handheld device. The user could use one hand to point the camera 905 in the handheld device at the object 930 while using the other hand to touch areas of interest 930. The handheld device could then introduce the corresponding tactile signal into the hand holding the device which causes the hand contacting the object 935 to feel the tactile sensation. Alternatively, the camera 905, tracking module 910, and the tactile selection module 915 may be integrated into a single device which communicates with the signal generator 925 via a wireless or wired communication method. One of ordinary skill will recognize the different combinations for integrating the components shown in system 900.

FIG. 9B illustrates a conceptual diagram of a system 901 that does not use tracking to provide tactile feedback to a user. As shown, the system 901 includes a wall 950 with two portions: a non-tactile portion 955 and a tactile portion 960. The non-tactile portion 955 may be a typical wall which may include any variety of materials—e.g., drywall, concrete, brick, etc. The tactile portion 960, as outlined by the dotted lines, may then be placed on the outside of the non-tactile portion 955 and coupled to ground. The tactile portion 960—e.g., a metal sheet or conductive paint—is shown as dotted lines because an insulator layer may be applied over the tactile portion 960 (as shown in FIG. 1) to insulate the tactile portion 960 from direct electrical contact with the user appendage 965 or a conductive element held by the user (e.g., a stylus).

The non-tactile portion 955 is not limited to insulator materials but is insulated from the same ground plane coupled to the signal generator 925 to prevent the user from perceiving a tactile sensation when the user contacts this portion 955. Thus, as the signal generator 925 injects the tactile signal into the user's hand 965, the user perceives the tactile sensation only when she moves her hand 965 in close proximity to the tactile portion 960 of the wall 950. The user would not perceive the tactile sensation once her hand 965 moves away from the tactile portion 960 and onto the non-tactile portion 955. In this manner, the tactile portion 960 acts like a path which guides the user to a destination. For example, the user may be visually impaired and use the tactile feedback from the signal generator 925 to guide her to a destination—e.g., the door. Because system 901 lacks a tracking sub-system, the signal generator 925 may constantly provide the tactile signal, or supply the signal at intervals to conserve power, instead of selectively providing the tactile signal based on received instructions.

Thus, system 901 does not need a tracking sub-system for identifying a location of the user's hand 965, but instead relies on patterning the electrode (i.e., the tactile portion 960) to provide information to the user. For example, a patterned electrode may be used to reveal a particular shape or picture that is invisible to the user. As the user moves her finger across the object she can identify, using tactile feedback, the location of the electrode, and thus, the pattern outlined by the electrode.

Of course, the system 901 could be modified to include a tracking system. In this case, the entire wall could be an electrode but the tracking system instructs the signal generator 925 to provide the tactile signal only when the hand 965 contacts the portion outlined in the dotted lines or provides a different tactile signal when the hand 965 is the dotted line portion in contrast to when the hand 965 is contacting the wall 950 in a portion outside of the dotted lines. Additionally, the tracking system could instruct the signal generator 925 to increase the intensity of the tactile signal as the user moves the hand closer to her destination, thereby indicating to the user the distance from her destination.

In one embodiment, because system 950 may lack a tracking system for determining when the hand 965 is in close proximity to the electrode 960, the signal generator 925 may apply a low power signal (i.e., a detection signal) for determining if the hand 965 is in close proximity to the electrode 960. For example, the signal generator 925 may produce a low amplitude voltage or small current in the user. Once the user's hand 965 creates an electrical path by touching surface of the wall 950 covering the electrode 960, the signal generator 925 may detect an increase in current, thereby indicating to the generator 925 that the user is interacting with a tactile objection. In response, the signal generator 925 may begin to provide an electrical signal for generating a tactile sensation in the user—i.e., a signal with a higher voltage and/or current. Similarly, if the current sensing circuit in the signal generator 925 determines the generated current falls below a predefined threshold, the generator 925 may once again switch into the detection state and output a low power signal. In this manner, the signal generator may conserve power and produce a signal (e.g., a voltage or current) needed for tactile sensation only when the user is interacting with an object with a tactile enabled surface, e.g., an insulated electrode sharing a common reference node with the signal generator.

FIGS. 10A-10B illustrate conceptual diagrams of grounding a signal generator and an object to a common electrical reference, according to embodiments described herein. In system 1000, the signal generator 925 is contained with the sole of the shoe 1005. To inject the tactile signal, the signal generator 925 is coupled to an upper electrode 1010A (e.g., a metallic plate) which couples directly or indirectly to the heel of the user. The tactile signal may then propagate to the point of user contact with an object that includes a grounded electrode. The shoe 1005 also includes a lower electrode 1010B (e.g., a metallic plate) that directly contacts the conductive floor 1015 which includes a connection to earth ground.

In other embodiments, the signal generator 925 is attached to furniture such as a chair. A user sitting in the chair contacts one of the electrodes while the other electrode is located at a point where the chair contacts the conductive floor 1015. Alternatively, the signal generator 925 may be handheld or worn by the user in which case the user may attach a wire to a ground shared with the object 935.

The object 935 is located on a conductive table 1020 which includes a connection to earth ground. The electrode on the object 935 is connected to the top surface of the conductive table 1020, thereby connecting the electrode to ground. Because both the conductive floor 1015 and conductive table 1020 connect to earth ground, the object 935 and the signal generator 925 are coupled to the same electrical reference point, thereby improving the ability of the generator 925 to produce the electrostatic force at the location where the user contacts the object 935. In one embodiment, the insulator layer may be removed from the portion of the object 935 that contacts the conductive table 1020 to improve the connection between the electrode and the common reference point. Further, a connecting element (e.g., a cable with a plug) may be attached to both the electrode of the object 935 and an earth ground connector in an AC socket. Or the user may attach the connecting element to both the signal generator 925 and the object's electrode, thereby creating a common ground.

In FIG. 10B, the signal generator 925 and object 935 are indirectly coupled to the common ground. As shown in system 1001, the shoe 1005 does not contact directly the conductive floor 1015 but instead contacts the insulated floor 1025. Accordingly, the bottom electrode 1010B is capacitively coupled to ground. The insulated floor 1025 may be made of wood, tile, carpet, linoleum, and other non-conductive materials.

Similarly, the electrode of the object 935 may be indirectly coupled to a common ground. Here, the conductive table may have a top, insulated surface 1030. Moreover, the insulated surface 1030 may combine with the insulated layer on the object to electrically isolate the electrode from the conductive table 1020. Nonetheless, the electrode may be capacitively coupled to the same reference point (e.g., earth ground) as the signal generator 925. Furthermore, the electrical paths between both the signal generator 925 and the object 935 to ground may include other portions that add to the impedances Z and Z' besides the points of contact shown in FIGS. 10A-10B.

Although the embodiments shown in FIG. 10A-10B illustrate electrically coupling the signal generator 925 and the object 935 to the same electrical reference point, it is possible to leave one of these components unconnected from the reference but this configuration may result in inconsistent potential difference between the user's finger and the object's electrode.

Figure 11:
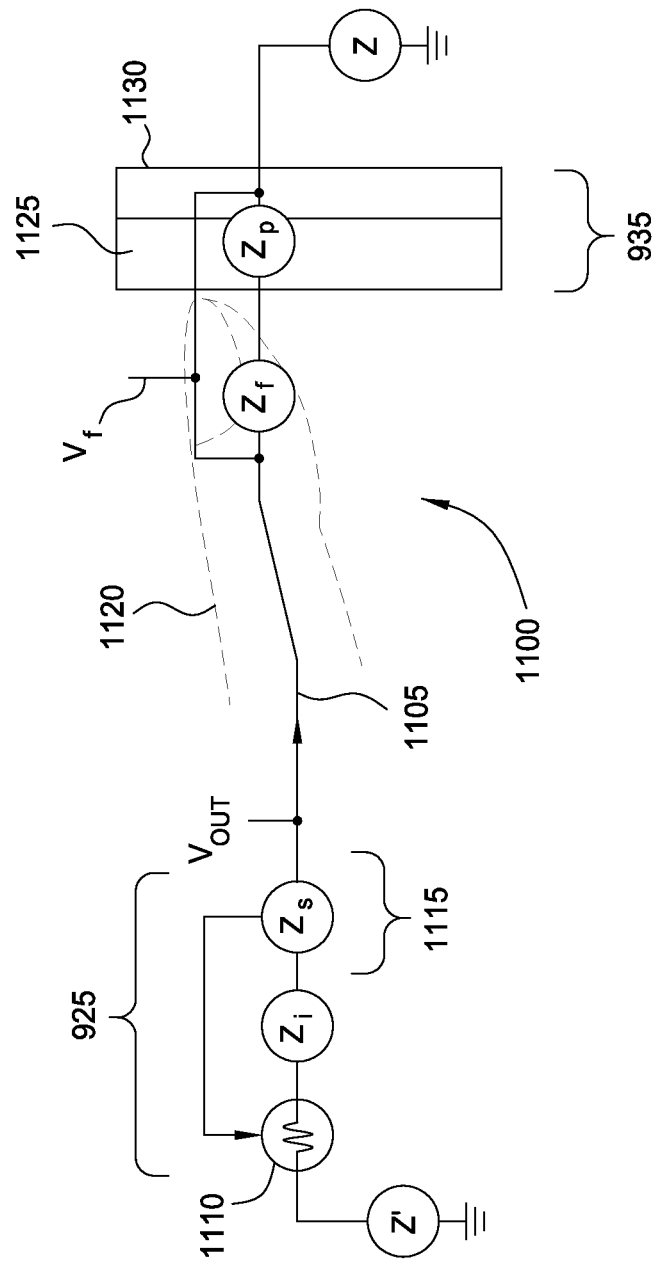
FIG. 11 illustrates impedance values in an electrical current path providing tactile feedback, according to one embodiment herein.

FIG. 11 illustrates impedance values in an electrical current path providing tactile feedback, according to one embodiment herein. The impedance of the electrical path 1105 changes dynamically, especially as the user contacts different objects. That is, the signal generator may be portable, such as the one shown in FIG. 10A-B, which the user may move between different objects. Doing so changes the impedance of the electrical path and alters the tactile signal generated by the signal generator 925.

The electrical circuit 1100 illustrates different impedances along the electrical path 1105. These impedances represent only a selected portion of the various impedances in the electrical path 1105. As discussed previously, impedance Z' represents the impedance between the signal generator 925 and the common reference point while impedance Z represents the impedance between the electrode of the object 935 and the common reference point. Impedance $Z_i$ represents the internal impedance of the signal generator 925, which may be designed to have a low impedance—e.g., less than 500 Ohms. Impedance $Z_s$ represents the impedance of the current sensing circuit 1115 which monitors the current produced by the signal generator 925 and uses the feedback loop to alter the signal generated by the AC voltage source 1110. The feedback loop enables the signal generator 925 to compensate for dynamically changing impedances in the electrical path 1105. This functionality which will be discussed in more detail below. The finger 1120 introduces the impedance $Z_f$ which may vary based on moisture on the surface that contacts the object 935 or the thickness of the layer of dry skin cells. Further, the object 935 introduces impedance $Z_p$ from the combination of the insulator layer 1125 and the electrode 1130.

In embodiments where the signal generator 925 is carried to various objects that are tactile feedback enabled (i.e., have a conductive surface), the value of the impedances shown may vary drastically. Specifically, Z' may vary depending on whether the signal generator 925 is coupled directly (e.g., a conductive floor) or indirectly (e.g., an insulated floor) to the common reference point. For example, the user may use the signal generator to provide a signal when standing on one room that has a metal floor but then move to a room that has a carpeted floor. Thus, the impedance Z' increases between the two environments. Similarly, the impedance Z may vary between an object whose electrode directly contacts a conductive surface coupled to ground or an object that rests on a table that has a thin layer of non-conductive paint. If the voltage source 1110 provides the same tactile signal in these various environments, the user perceives different tactile sensation. That is, even if the user is supposed to feel the same tactile sensation, the different impedances change the voltage difference (i.e., the voltage drop $V_f$) between the finger 1120 and the electrode 1130, and thus, the intensity of the tactile sensation perceived by the user. Moreover, because the impedance $Z_f$ of the finger may change between different users, each user may feel a different tactile sensation even if all the other impedances are the same.

As mentioned above, the same tactile sensation is perceived by the user so long as the same signal (i.e., same amplitude, frequency, and wavelength) is applied between the user's finger 1120 and the surface of the object 935. However, changing impedances change the value of the amplitude ($V_f$), and thus, the tactile sensation. For example, if all the impedances remain the same except that the impedance Z' increase, then the value of $V_f$ decreases and changes the tactile sensation perceived by the user. However, if the current of the electrical path is maintained at a constant value, then the voltage $V_f$ does not change as the net impedance of the electrical path 1105 fluctuates. Note that maintaining a constant current in the electrical path 1105 changes the amplitude of the tactile signal (Vout) generated at the signal generator 925, but the local voltage $V_f$ between the finger and 1120 and the electrode 1130 remains constant. Accordingly, configuring the signal generator 925 to output a constant current provides the correct tactile sensation despite changing net impedances.

Signal Generator for Producing Uniform Tactile Sensations

Figure 12A:
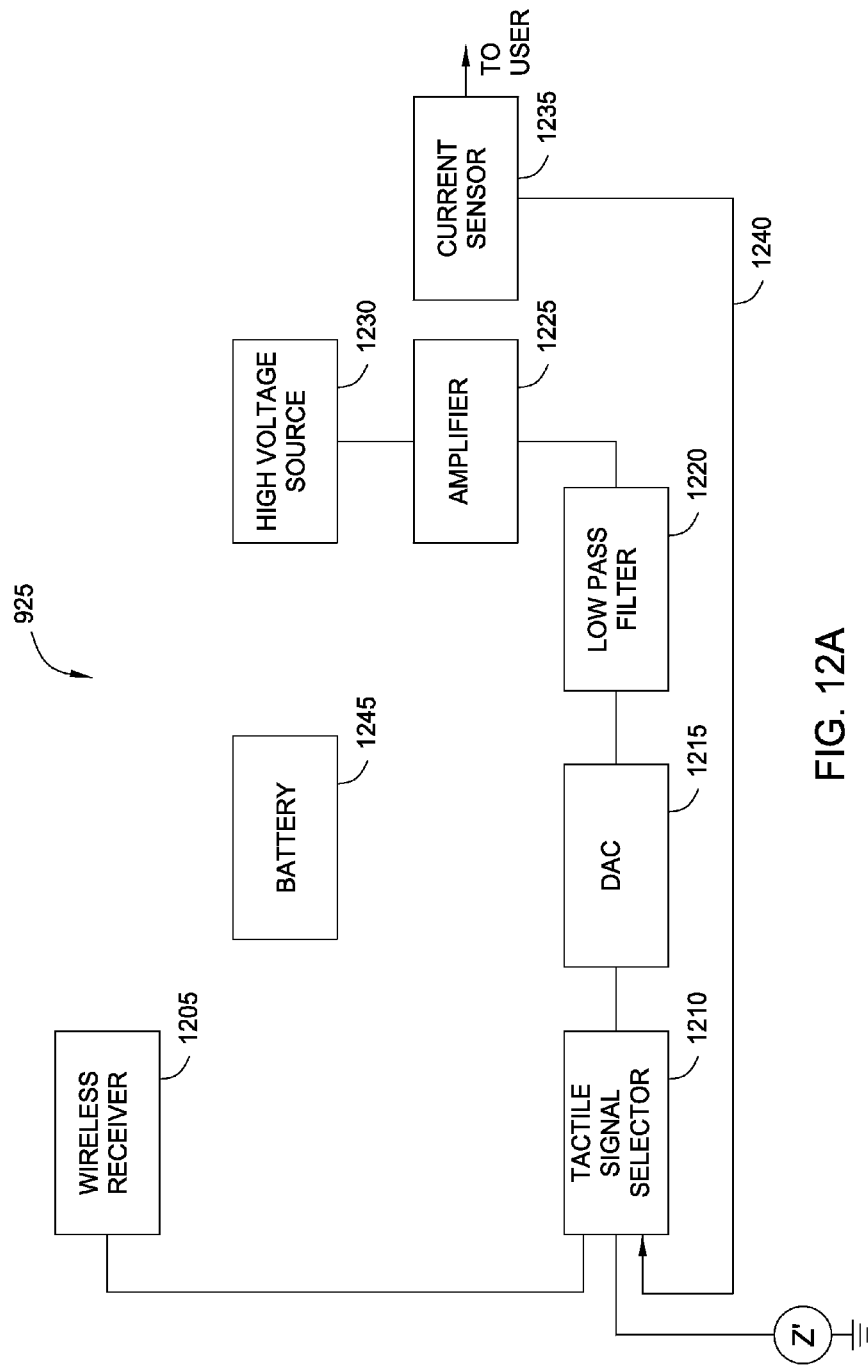
FIGS. 12A-12B illustrate system diagrams of a signal generator with a feedback loop, according to embodiments described herein.
Figure 12B:
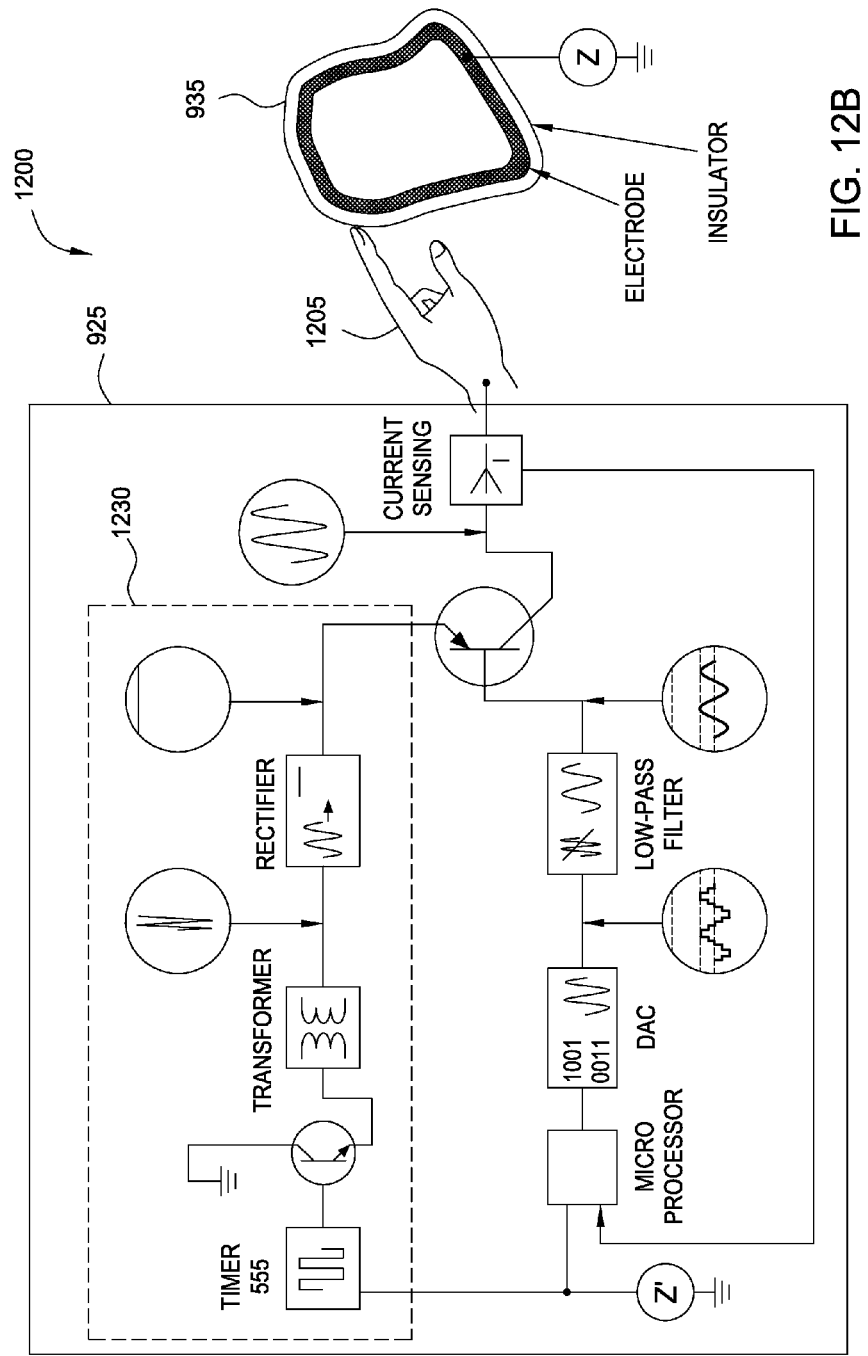

FIGS. 12A-12B illustrate system diagrams of a signal generator with a feedback loop, according to embodiments described herein. Specifically, the signal generator 925 is designed to produce consistent tactile sensation across different environments and contexts—e.g., the tactile stimulus feels identical no matter the values of the impedances generated from the user's location, clothing, the object's location, etc. To ensure the same tactile sensation is perceived by the user, the signal generator 925 dynamically adjusts the signal amplitude depending on the varied impedances—e.g., the impedances shown in FIG. 11.

The signal generator 925 includes a wireless receiver 1205 which communicates with a tracking system that identifies the proper tactile signal to provide. The tracking system may send a wireless signal to the wireless receiver 1205 that stipulates the tactile signal to provide. The wireless receiver 1205 forwards the data to the tactile signal selector 1210 which, if necessary, decodes the data and generates a digital signal of the tactile signal. The digital to analog convertor (DAC) 1215 converts the digital signal into an analog tactile signal which is filtered by the low pass filter 1220 to remove any high frequency components (e.g., noise) from the tactile signal. The frequency of the filtered tactile signal typically ranges from 10 to 1000 Hz. But the tactile signal may include signal components with much higher frequencies than 1000 Hz if, for example, the tactile signal is a square wave or a pulse. Note that in these example, the low pass filter 1220 may be bypassed.

The filtered tactile signal is then provided to the amplifier 1225 and converted into a high voltage signal (i.e., V(t)). To accomplish this, the amplifier 1225 relies on a DC voltage (e.g., 300 VDC) from the high voltage source 1230 to generate a high voltage but low current tactile signal—e.g., a 20 to 500 Vpp signal limited to 150 µA. Before the signal reaches the user, the signal is passed through the current sensor 1235 which measures the average current (e.g., the root mean square) of the signal. Specifically, the current sensing circuit measures the voltage drop across a small resistor connected in series. The current sensor 1235 forwards the average current along the feedback loop 1240 to the tactile signal selector 1210 which uses the average current to adjust the tactile signal, and thus, compensate for dynamically changing impedances. A variation in the impedances results in a change of the output current. However, the feedback loop 1240 permits the tactile signal selector 1210 to adjust the digital signal and provide the desired average current to the user's appendage contacting the object. For example, if the impedance Z increases, the feedback loop 1240 causes the signal generator 925 to generate a tactile signal with greater amplitude voltage, which maintains the voltage difference between the user's finger and the object. The same process may apply even if the user relies on, for example, a stylus or other conductive element to contact the object.

In one embodiment, the signal generator may include a battery 1245 to enhance the portability of the signal generator. For example, the different components, such as the wireless receiver, tactile signal selector, or high voltage source pull power from the battery 1245 in order to perform their functions. These components may be connected to a shared printed circuit board. The power consumption of such a system may vary from 100-400 mA at 5V.

FIG. 12B illustrates a system diagram of the signal generator 925. The system 1200 includes the signal generator 925 coupled to the user appendage 1205 contacting the object 935. The signal generator 925 includes a 555 timer that switches the transformer on and off using the transistor switch. This switching creates a high frequency and high voltage signal that is rectified to produce a high voltage DC signal (e.g., approximately 300V). These components may be part of the high voltage source 1230 shown in FIG. 12A.

The micro processor (i.e., a tactile signal selector 1210) identifies a digital signal stored in a memory module (not shown) which causes the signal generator 925 to yield the correct tactile sensation. That is, the micro processor may receive information from a wireless receiver (e.g., a Bluetooth® antenna module) that dictates what tactile signal should be produced. For example, the wireless receiver may specify that the signal generator 925 produce a 30 Vpp, 400 Hz square wave. The micro processor may use these specifications to look up in a memory module a digital signal that corresponds to these specifications. Alternatively, the micro processor may receive from the wireless receiver a specified tactile sensation, such as "moderately waxy," which the micro processor uses to parse the memory module and identify the digital signal that produces the tactile signal corresponding to the moderately waxy tactile sensation. The selected digital signal (i.e., a string of 1 and 0s), when inputted into the DAC, generates a periodic tactile signal. The analog tactile signal is then filtered and amplified before being passed through the current sensing circuit. Once the user appendage moves along the surface of the object 935, the user perceives the tactile sensation associated with the tactile signal.

As mentioned earlier, the feedback loop between the current sensing circuit and the micro processor changes the tactile signal based on the average current. Specifically, the micro processor compares the measured current to a reference current. For example, during a calibration process, the impedances (e.g., Z, Z', Zp) may be controlled and a current measured for each tactile sensation. These reference currents may also be stored in the same memory module as the characteristics of the tactile signal. The reference currents are then later compared to the measured current provided by the feedback loop in an environment where the impedances are changing. The micro processor adjusts the digital signal to match the measured current to the predetermined reference current. Eventually, the tactile signal is adjusted such that the measured current is substantially equal to reference current. Thus, even though the impedances have changed from the calibration process, the feedback loop ensures the signal generator provides a signal with the same current to user, thereby providing the same tactile sensation. Specifically, in order to match the measured current to the reference current, the signal generator 925 dynamically changes the amplitude of the tactile signal. In one embodiment, the signal generator 925 is able to match an output current to a reference and settle the output tactile signal in 500 ms or less when a change of impedance occurs.

In one embodiment, the memory module may be built into the micro processor itself or could be disposed elsewhere within the signal generator 925. The memory module may contain either volatile or nonvolatile memory such as read only memory (ROM) and/or random access memory (RAM). However, nonvolatile memory may be preferred since the reference currents may be saved in memory even if the signal generator 925 is powered down, thereby avoiding the need to repeat the calibration process.

Figure 13:
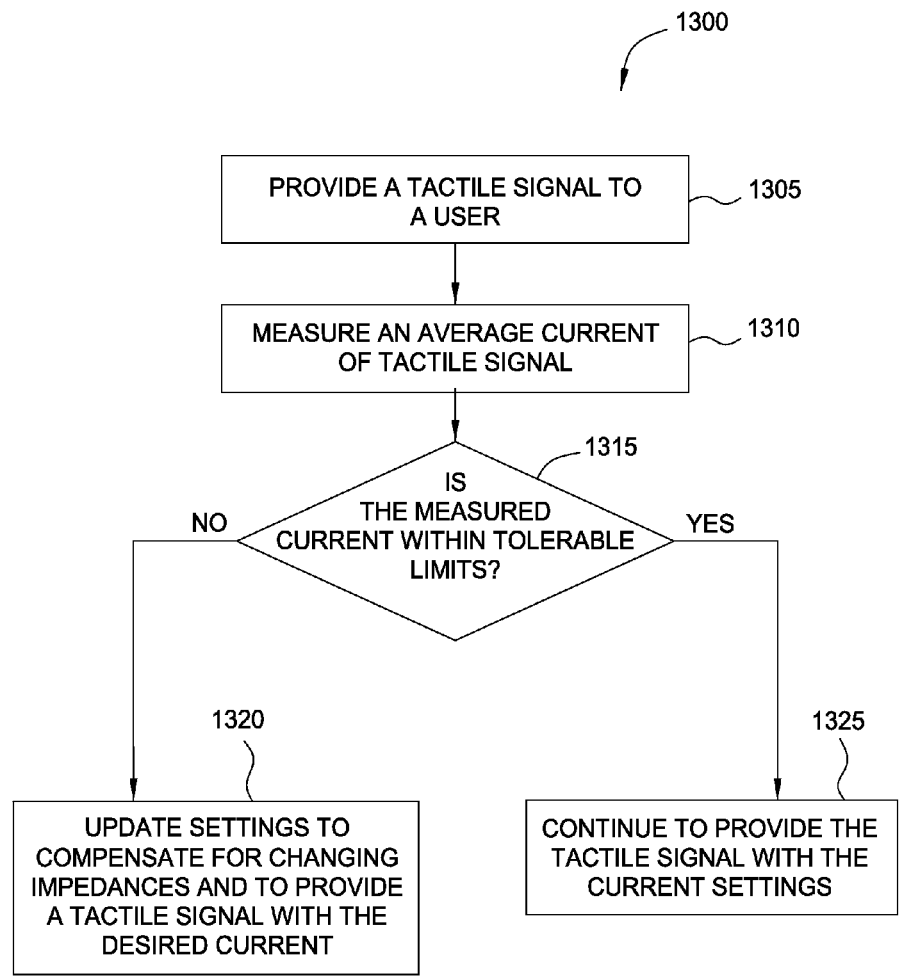
FIG. 13 is a flow diagram of method steps for providing a constant current for tactile sensation, according to one embodiment described herein.

FIG. 13 is a flow diagram of method steps for providing a constant current for tactile sensation, according to one embodiment described herein. Method 1300 begins at step 1305 by providing a tactile signal to a user. The signal generating the tactile signal may be directly or indirectly coupled to the user. As the user moves an appendage along the surface on an object configured for tactile feedback, the tactile signal generates an electrostatic force between the object's surface and the user. The electrostatic force enables the user to perceive a corresponding tactile sensation—e.g., waxy, sticky, rough, smooth, etc.—different from the texture of the object's surface.

At step 1310, an average current of the tactile signal is measured by a current sensing circuit. For example, the signal generator may pass the tactile signal through the current sensing circuit before the signal is propagated into the user. Because different environment introduce different impedances, the amplitude (i.e., the intensity) of the tactile signal may vary according to the different environments. That is, the signal generator may intend for the user to perceive the same tactile sensation when touching two different objects, and thus, output the same tactile signal in both instances. However, because the objects may be associated with different impedances, the voltage drop between the user's finger and the electrode of the object may be different which results in the user perceiving a different tactile sensation when touching the two objects.

At step 1315, the current sensing circuit forms part of a feedback loop which updates the tactile signal produced by the signal generator. Based on the average current, the signal generator can increase or decrease the voltage amplitude of the tactile signal such that the current of the tactile signal is the same when the user is touching both objects. This enables the signal generator to provide the same current and the same tactile sensation regardless of varying impedances. Doing so maintains the same voltage drop between the user's finger and the electrode. Thus, the signal generator may accurately be described as a high voltage current driver that maintains a constant current despite changing impedances.

Specifically, the signal generator may include one or more reference currents that are compared to the average current measured by the current sensing circuit. These references currents may be obtained by measuring the current in an environment where the impedances are known. If the measured current is beyond a predetermined threshold from the associated reference current (e.g., +/−5 μA), the signal generator determines that the measured current is not within tolerable limits.

At step 1320, the signal generator changes its settings to compensate for environments with different impedances. For example, to generate a "waxy" tactile sensation, the signal generator may need to produce a 400 Hz sine wave with a current of 100 μA. Thus, when the signal generator attempts to produce the waxy sensation in an environment where the impedances are not known, the signal generator provides a 400 Hz sine wave and uses the feedback loop to adjust the peak-to-peak voltage of the signal until the signal's average current reaches 100 μA. Thus, the signal generator updates the settings to vary the amplitude of the tactile signal.

If the measured current is within the predefined threshold, at step 1325, the signal generator continues to provide the tactile signal based on the current settings—i.e., the amplitude of the tactile signal remains unchanged. The signal generator may continue to monitor the feedback loop to determine if the impedances change—e.g., the signal generator is moved to a different location or the user contacts a portion of the object that has greater impedance. Moreover, the signal generator may receive a request from a tracking system to generate a tactile signal associated with a different sensation—e.g., a "rough" sensation. Based on the request, the signal generator sets the frequency, waveshape, and amplitude of the signal. However, after receiving the average current from via the feedback loop, the signal generator may compare the average current to a different reference current than the one used previously—e.g., a reference current associated with a "rough" sensation—and adjust the signal's amplitude accordingly.

Figure 14:
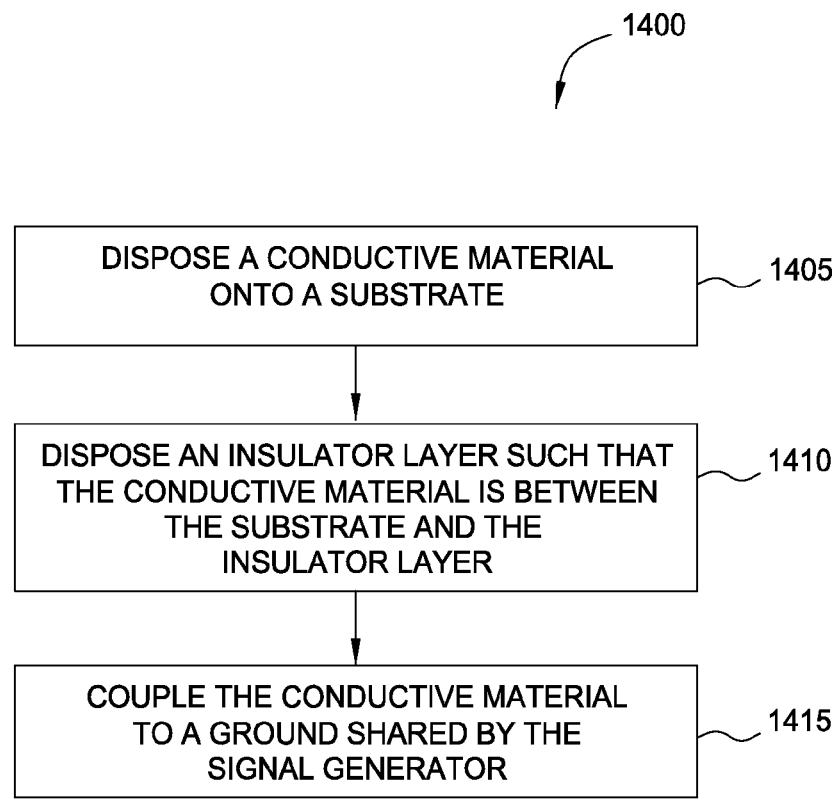
FIG. 14 is a flow diagram of method steps for fabricating and arranging a tactile compatible object, according to one embodiment described herein.

FIG. 14 is a flow diagram of method steps for fabricating and arranging a tactile compatible object, according to one embodiment described herein. As used herein, a "tactile compatible object" includes at least one conductive layer (i.e., an electrode) capable of being directly or indirectly coupled to ground. A tactile compatible object may also include an insulator layer between the conductive layer and the outer surface of the object. Some objects do not need to be altered to be compatible with tactile feedback. For example, objects that have been anodized (e.g., a surface portion of a metal layer is converted into an insulating oxide while an internal portion remains metallic) or capacitive touch screens both provide internal electrodes and surface insulator layers. However, many objects may be altered or converted to become tactile compatible objects. Method 1400 is a possible technique for fabricating these objects.

At step 1405, a conductive layer is applied onto the object—i.e., a substrate. The conductive layer may be deposited using vacuum-based deposition techniques or a plating process such as electroplating. Further, the substrate may be coated with a conductive paint. As mentioned above, the conductive layer (i.e., an electrode) may be patterned into any shape on the substrate. Moreover, the conductive layer may be divided into multiple individual electrodes.

In one embodiment, step 1405 may include fabricating a connector onto the one or more electrodes of the conductive layer. For example, a wire may be soldered onto the electrode which permits the electrode to be connected easily to an electrical reference point shared with the signal generator. Referring to FIG. 10A, the wire may be then coupled to the conductive table 1020 which provides an electrical path to ground. However this is not a requirement since the electrode may be coupled indirectly to ground as shown in FIG. 10B.

At step 1410, an insulator layer is disposed such that the conductive material is between the substrate and the insulator layer. Moreover, the insulator layer may also be deposited directly onto the substrate. For example, the conductive layer may be patterned such that it does not cover the entire surface of the object. In these uncovered portions, the insulator layer may be directly deposited onto the substrate. FIG. 9B illustrates a wall with a conductive layer 960 that is only deposited onto a portion of the wall 950; however, the insulator layer may be applied over the entire surface of the wall—i.e., the tactile portion 960 and the non-tactile portion 955. In contrast, FIG. 9A shows an embodiment where the electrode covers the entire outer surface of the object 935, and thus, the insulator layer is not directly deposited onto the substrate. Of course, the insulator layer may be patterned the same as the conductive layer which permits a top layer of the substrate to remain exposed.

The insulator layer may be applied, e.g., by painting thin layers of varnish or anodizing a suitable conductive layer. The insulator layer may be fabricated with any desired thickness. However, the dielectric constant of the chosen material and thickness of the insulator layer influence the tactile sensation intensity. For example, for a given thickness, a high dielectric constant ($\in_r$) increases the tactile sensation intensity. Furthermore, regardless of which layer is exposed on the outer surface, in one embodiment, the surface is smooth but not glossy in order to enhance the electrovibration.

As mentioned previously, the outer layers of the human skin may act as an insulation layer, thereby eliminating step 1410 from method 1400. Sweat, however, lowers the insulation properties of the skin and decreases the tactile sensation. By coating the electrode layer with the insulator layer, the tactile system is less dependent on moisture and allows high amplitudes of tactile signal without reaching the skin breakdown voltage (~100V).

At step 1415, the object may be placed on or near an electrical path that couples the conductive layer to a common electrical reference point—e.g., earth ground. Alternatively, the conductive layer may be directly attached to the signal generator using a cable, wire, clip, or other mechanical connector which serves as the common electrical reference point.

System Overview

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 15:
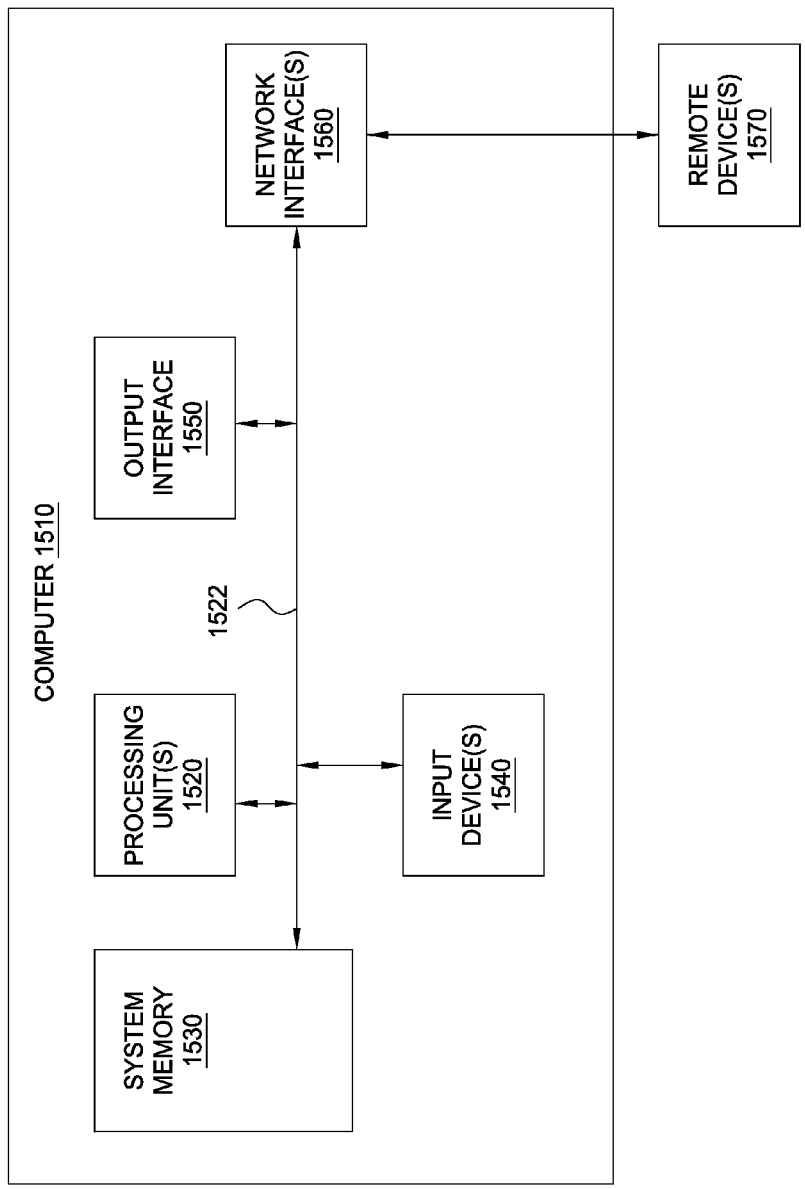
FIG. 15 is a block diagram of a system configured to implement one or more aspects of the invention.

FIG. 15 is a block diagram of a system configured to implement one or more aspects of the invention. An example device that may be used in connection with one or more embodiments includes a computing device in the form of a computer 1510. Components of computer 1510 may include, but are not limited to, a processing unit 1520, a system memory 1530, and a system bus 1522 that couples various system components including the system memory 1530 to the processing unit 1520. Computer 1510 may include or have access to a variety of computer-readable media. The system memory 1530 may include computer-readable storage media, for example in the form of volatile and/or nonvolatile memory such as read only memory (ROM) and/or random access memory (RAM). By way of example, and not limitation, system memory 1530 may also include an operating system, application programs, other program modules, and program data.

A user can interface with (for example, enter commands and information) the computer 1510 through input devices 1540. A monitor or other type of display surface can also be connected to the system bus 1522 via an interface, such as an output interface 1550. In addition to a monitor, computers may also include other peripheral output devices. The computer 1510 may operate in a networked or distributed environment using logical connections to one or more other remote device(s) 1570 such as other computers. The logical connections may include network interface(s) 1560 to a network, such as a local area network (LAN), a wide area network (WAN), and/or a global computer network, but may also include other networks/buses.

Certain embodiments are directed to systems and associated methods for creating tactile interfaces on surfaces that do not use any form of mechanical actuation. Instead, certain embodiments exploit the principle of "electrovibration," which allows creation of a broad range of tactile sensations by controlling electrostatic friction between the surface and a user's fingers. When combined with an input-capable interactive display, embodiments enable the creation of a wide variety of interactions augmented with tactile feedback. Various example embodiments are described in further detail below. The details regarding the example embodiments provided above are not intended to be limiting, but are merely illustrative of example embodiments.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

CONCLUSION

An electrical tactile signal uses an electrical path that includes a signal generator, a user's body, and an object to generate a particular tactile sensation that is felt by the user. Specifically, the signal generator introduces the tactile signal into the user which causes an electrovibration at a point where the user contacts the object. The user perceives this electrovibration as a particular tactile sensation—e.g., waxy, smooth, rough, sticky, etc. However, the electrical path includes various impedances (e.g., the impedance between the signal generator and ground, the impedance of the user's body, or the impedance between the object and ground) which affect the amplitude of the tactile signal. If the net impedance of the electrical path changes, then the amplitude of the tactile signal, and thus, the tactile sensation also change. For example, if the user touches a different object which has a different associated impedance, even if the signal generator uses the same settings to produce the tactile signal, the signal will have a different amplitude which results in the user perceiving a different tactile sensation.

To maintain consistency in different environments with different impedances, a high voltage current driver may be used as the signal generator to maintain a tactile signal with a constant current. The constant current ensures that the voltage between the user's finger and the object's surface remains the same even if impedances in the electrical path change. Specifically, the current driver includes a current sensing circuit that determines the average current being generated. Using a feedback loop, the measured current is compared to a reference current to determine if the correct tactile sensation is perceived by the user. As the impedance changes, the current driver detects the resulting change in the signal's current and adjusts the voltage amplitude of the tactile signal in order to match the measured current to the reference current. Ensuring that the current of the tactile signal remains constant, even when the impedances of the electrical path changes, maintains the voltage between the user's finger and the object's surface resulting in the user perceiving the same tactile sensation independent of the impedances' values.

While the foregoing is directed to embodiments of the present invention, other and further embodiments of the invention may be devised without departing from the basic scope thereof, and the scope thereof is determined by the claims that follow.

What is claimed is:

1. A method, comprising:
   generating an electrical signal in a first electrical path, the electrical signal causing a user to perceive a tactile sensation as a contact surface of the first electrical path is urged by the user along a surface of an object;
   measuring a current of the electrical signal;
   comparing the measured current to a reference current associated with a predetermined tactile sensation; and
   adjusting at least one characteristic of the electrical signal so that the current of the electrical signal substantially matches the reference current and generates the predetermined tactile sensation at the user.

2. The method of claim 1, wherein the at least one characteristic is a voltage amplitude of the electrical signal, and wherein the contact surface of the first electrical path is at least one of an appendage of the user and a conductive element held by the user.

3. The method of claim 1, wherein the object comprises a conductive layer and an insulator layer, wherein at least a portion of the conductive layer is covered by the insulator layer.

4. The method of claim 3, wherein the conductive layer is coupled to a same electrical reference point as a signal generator generating the electrical signal.

5. The method of claim 1, further comprising:
   receiving an instruction from a motion detection system tracking a location of an appendage of the user or a conductive element held by the user on the surface of the object, wherein at least one characteristic of the electrical signal is defined based on the instruction.

6. A method, comprising:
   generating an electrical signal in a first electrical path, the electrical signal causing a user to perceive a tactile sensation as a contact surface of the first electrical path is urged by the user along a surface of an object;
   measuring a current of the electrical signal;
   adjusting at least one characteristic of the electrical signal based on the measured current to generate a predetermined tactile sensation at the user; and
   after adjusting the at least one characteristic of the electrical signal:
      generating the electrical signal when an appendage of the user or a conductive element held by the user touches a different object, thereby creating a second electrical path comprising a different net impedance relative to a net impedance of the first electrical path,
      measuring the current of the electrical signal in the second electrical path, and
      adjusting one or more characteristics of the electrical signal based on the measured current in the second electrical path to produce a same tactile sensation at the appendage that was produced using the first electrical path.

7. A signal generator, comprising:
   a tactile signal module configured to generate an electrical signal in an electrical path, the electrical signal causing a user to perceive a tactile sensation as a contact surface of the electrical path is urged by the user along a surface of an object; a current sensing circuit configured to measure a current of the electrical signal; and a feedback loop configured to transmit the measured current to the tactile signal module, wherein the tactile signal module is configured to compare the measured current to a reference current associated with a predetermined tactile sensation, and adjust at least one characteristic of the electrical signal so that the current of the electrical signal substantially matches the reference current and generates the predetermined tactile sensation at the user.

8. The signal generator of claim 7, further comprising:
   a first electrical interface configured to introduce the electrical signal to a body of the user; and
   a second electrical interface configured to couple the signal generator to an electrical reference point shared with the object.

9. The signal generator of claim 7, wherein the tactile signal module is configured to alter a voltage amplitude of the electrical signal based on the measured current, wherein the contact surface is at least one of an appendage of the user and a conductive element held by the user.

10. The signal generator of claim 7, further comprising:
a wireless receiver configured to receive an instruction from a motion detection system tracking a location of an appendage of the user or a conductive element held by the user on the surface of the object, wherein at least one characteristic of the electrical signal is defined based on the instruction.

11. The signal generator of claim 7, wherein the tactile signal module is configured to generate a detection signal when the measured current falls below a predefined current threshold, wherein the detection signal uses less power than the electrical signal that produces the tactile sensation.

12. The signal generator of claim 7, further comprising a battery configured to power the tactile signal module.

13. A system, comprising:
a first object;
a first signal generator configured to generate a first electrical signal in a first electrical path, the first electrical signal causing a first user to perceive a tactile sensation as a first contact surface of the first electrical path is urged by the first user along a surface of the first object,
wherein the first signal generator is configured to measure a current of the first electrical signal,
wherein the first signal generator is configured to transmit the measured current to a tactile signal module, and wherein the tactile signal module is configured to adjust at least one characteristic of the first electrical signal based on the measured current to generate a predetermined tactile sensation at the user; and
a second signal generator configured to generate a second, different electrical signal in a second electrical path, the second electrical signal causing a second user to perceive a different tactile sensation relative to the tactile sensation perceived by the first user as a second contact surface of the second electrical path is urged by the second user along the surface of the first object,
wherein the first and second contact surfaces of the first and second electrical paths contact the surface of the first object simultaneously.

14. The system of claim 13, wherein the first object comprises a conductive layer and an insulator layer, wherein at least a portion of the conductive layer is covered by the insulator layer, and
wherein the conductive layer and the first signal generator are coupled to a same electrical reference.

15. The system of claim 13, further comprising a tracking module configured to track movement of the contact surface on the surface of the first object and transmit, based on a location, an instruction to the first signal generator controlling when the first signal generator generates the electric signal.

16. The system of claim 15, wherein the tracking module is configured to transmit a first instruction when the contact surface is at a first location on the surface of the first object and a second instruction when the contact surface is at a second location on the surface of the first object, the first instruction causing the signal generator to generate a different electric signal relative to an electric signal generated in response to the second instruction.

17. A system, comprising:
a first object;
a first signal generator configured to generate a first electrical signal in a first electrical path, the first electrical signal causing a first user to perceive a tactile sensation as a first contact surface of the first electrical path is urged by the first user along a surface of the first object,
wherein the first signal generator is configured to measure a current of the first electrical signal,
wherein the first signal generator is configured to transmit the measured current to a tactile signal module, and wherein the tactile signal module is configured to adjust at least one characteristic of the first electrical signal based on the measured current to generate a predetermined tactile sensation at the user; and
a second object,
wherein the first signal generator is configured to generate the first electrical signal when the first user contacts the second object, thereby creating a second electrical path comprising a different net impedance relative to a net impedance of the first electrical path,
wherein the first signal generator is configured to measure the current of the first electrical signal in the second electrical path, and adjust one or more characteristics of the first electrical signal based on the measured current in the second electrical path to produce a same tactile sensation at the first user that was produced using the first electrical path.

* * * * *